(12) United States Patent
Harish et al.

(10) Patent No.: US 12,743,910 B2
(45) Date of Patent: Sep. 22, 2026

(54) VEHICLE MODE DETECTION SYSTEMS

(71) Applicant: Allstate Insurance Company, Northbrook, IL (US)

(72) Inventors: Pratheek M. Harish, Chicago, IL (US); Aaron D. Daly, Belmont, CA (US); Jeremy Ber, Wheeling, IL (US); Andrew L. Carbery, Bartlett, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 18/404,393

(22) Filed: Jan. 4, 2024

(65) Prior Publication Data

US 2024/0221440 A1 Jul. 4, 2024

Related U.S. Application Data

(60) Continuation of application No. 17/344,296, filed on Jun. 10, 2021, now Pat. No. 11,915,535, which is a (Continued)

(51) Int. Cl.

| | |
|---|---|
| ***G01C 21/00*** | (2006.01) |
| ***G01C 21/10*** | (2006.01) |
| ***G01C 21/30*** | (2006.01) |
| ***G01C 21/34*** | (2006.01) |
| ***G01C 21/36*** | (2006.01) |

(Continued)

(52) U.S. Cl.

CPC ............... *G07C 5/02* (2013.01); *G01C 21/10* (2013.01); *G01C 21/30* (2013.01); *G01C 21/3423* (2013.01); *G01C 21/343* (2013.01); *G01C 21/3697* (2013.01); *G06Q 40/08* (2013.01); *G07C 5/008* (2013.01)

(58) Field of Classification Search

None

See application file for complete search history.

(56) References Cited

U.S. PATENT DOCUMENTS

| | | | |
|---|---|---|---|
| 5,541,845 | A | 7/1996 | Klein |
| 8,527,140 | B2 | 9/2013 | Schwartz et al. |

(Continued)

FOREIGN PATENT DOCUMENTS

| | | | |
|---|---|---|---|
| CN | 104751631 | A | 7/2015 |
| EP | 2535858 | A1 | 12/2012 |

(Continued)

OTHER PUBLICATIONS

Apr. 21, 2017—(US) Non-Final Office Action—U.S. Appl. No. 15/251,778, 12 pages.

(Continued)

*Primary Examiner* — James M Mcpherson

(57) ABSTRACT

Aspects of the present disclosure describe systems, methods, and devices for vehicle mode detection based on acceleration data and location data during a trip detected by mobile devices in a vehicle. According to some examples, location data will be compared to known routeway data to detect a vehicle mode. In other examples acceleration data will be used to calculate the consistency of vehicular velocity during a trip to detect a vehicle mode. In some additional aspects, multiple analyses will be performed on the same data sets to check for false positives with vehicle mode detection.

16 Claims, 9 Drawing Sheets

Related U.S. Application Data division of application No. 16/022,232, filed on Jun. 28, 2018, now Pat. No. 11,049,337, which is a continuation of application No. 15/251,778, filed on Aug. 30, 2016, now Pat. No. 10,037,635.

(51) Int. Cl.

| | |
|---|---|
| ***G06Q 40/08*** | (2012.01) |
| ***G07C 5/00*** | (2006.01) |
| ***G07C 5/02*** | (2006.01) |

(56) References Cited

U.S. PATENT DOCUMENTS

| | | | |
|---|---|---|---|
| 8,886,457 | B2 | 11/2014 | Brandt |
| 8,972,172 | B2 | 3/2015 | Bird et al. |
| 9,200,918 | B2 | 12/2015 | Chelotti et al. |
| 9,323,303 | B2 | 4/2016 | Ho et al. |
| 10,037,635 | B2 | 7/2018 | Harish et al. |
| 10,755,356 | B1 | 8/2020 | LaBarre et al. |
| 2009/0216704 | A1 | 8/2009 | Zheng et al. |
| 2010/0029292 | A1 | 2/2010 | Wan et al. |
| 2010/0292921 | A1 | 11/2010 | Zachariah et al. |
| 2012/0172017 | A1 | 7/2012 | Ratti et al. |
| 2013/0260791 | A1 | 10/2013 | Malinovskiy et al. |
| 2014/0162219 | A1 | 6/2014 | Stankoulov |
| 2015/0177013 | A1 | 6/2015 | Siliski et al. |
| 2015/0198722 | A1* | 7/2015 | Ben-Akiva .......... G08G 1/0112 701/472 |
| 2015/0213555 | A1 | 7/2015 | Barfield, Jr. et al. |
| 2016/0203649 | A1 | 7/2016 | Berkobin et al. |
| 2016/0327397 | A1 | 11/2016 | Cordova et al. |
| 2016/0356622 | A1 | 12/2016 | McGavran et al. |
| 2017/0200324 | A1 | 7/2017 | Chennakeshu |

FOREIGN PATENT DOCUMENTS

| | | | |
|---|---|---|---|
| JP | 2012014357 | A | 1/2012 |
| JP | 2013257774 | A | 12/2013 |
| JP | 2014109816 | A | 6/2014 |
| JP | 2014182610 | A | 9/2014 |
| WO | WO-2014207914 | A1 | 12/2014 |
| WO | WO-2016033330 | A1 | 3/2016 |

OTHER PUBLICATIONS

Sep. 15, 2017—(US) Final Office Action—U.S. Appl. No. 15/251,778, 13 pages.

Jan. 12, 2018—US) Non-Final Office Action—U.S. Appl. No. 15/251,778, 5 pages.

Mar. 30, 2018—(US) Notice of Allowance—U.S. Appl. No. 15/251,778, 8 pages.

Apr. 29, 2020—(CA) Office Action—Application No. 3,035,519, 5 Pages.

Nov. 16, 2020—(CA) Notice of Allowance—Application No. 3,035,519.

Oct. 19, 2020—(IN) Examination Report—Application No. 201947010990, 6 Pages.

Sep. 8, 2020 (JP) Notice of Reasons for Rejection—Application No. 2019-511566, 6 Pages.

Feb. 17, 2021—(EP) Examination Report—Application No. 17847298.1, 6 Pages.

Jun. 1, 2021—(JP) Notice of Reasons for Rejection—Application No. 2019-511566, 6 Pages.

Apr. 19, 2022—(JP) Office Action—Application No. 2019-511566, 5 Pages.

Nov. 14, 2023—(JP) Office Action—Patent Application No. 2022-199211, 5 Pages.

Extended European Search Report for European Application No. 17847298.1 dated Mar. 13, 2020, 8 pages.

Frendberg M., "Determining Transportation Mode through Cell-phone Sensor Fusion," Massachusetts Institute of Technology, Journal, Jun. 2011, 34 Pages.

International Preliminary Report on Patentability for International Application No. PCT/US2017/048869, mailed Mar. 14, 2019, 10 pages.

International Search Report and Written Opinion for International Application No. PCT/US2017/048869, mailed Nov. 6, 2017, 11 pages.

* cited by examiner

VEHICLE MODE DETECTION SYSTEMS

CROSS-REFERENCE TO RELATED APPLICATIONS

This application is a continuation of U.S. patent application Ser. No. 17/344,296 filed Jun. 10, 2021, which is a divisional of U.S. patent application Ser. No. 16/022,232 filed Jun. 28, 2018, which is a continuation of U.S. patent application Ser. No. 15/251,778, filed Aug. 30, 2016, issued as U.S. Pat. No. 10,037,635 on Jul. 31, 2018. Each of these applications is incorporated by reference in its entirety herein.

TECHNICAL FIELD

Various aspects of the disclosure generally relate to the analysis of location data and acceleration data. For example, aspects of the disclosure are directed to receiving and transmitting location data and acceleration data and analyzing the data to detect a vehicle mode of a user during a travel segment.

BACKGROUND

Insurance providers value the ability to collect driving information of various users for use in evaluating risk, providing incentives, adjusting premiums, and the like. Although techniques exist to generally capture data from sensors on smartphones and in vehicles, they may not recognize a type of vehicle or mode of transportation associated with data sets (e.g., car vs. train, etc.). While providers desire information relating to the operation of a vehicle by a user, data recorded while the user is a passenger in a car, train, airplane, boat, bicycle, or other mode of transportation may hinder the ability to determine accurate driving information related to the user. Therefore, it is beneficial to recognize the vehicle mode associated with the user during a travel segment.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Various aspects discussed herein are related to improving data collection by analyzing location data and acceleration data to determine a vehicle mode of a user during travel. Aspects of the disclosure relate to methods, computer-readable media, systems, and apparatuses for determining a vehicle mode based on real-time or near real-time navigational analysis using sensor data, acceleration data, positioning data, digital image data, and/or a map database. In some arrangements, the system may be a vehicle mode system that includes at least one processor; and at least one memory storing computer-executable instructions that, when executed by the at least one processor, cause the vehicle mode system to perform vehicle mode analysis.

In some aspects the computing device may determine one or more real-time factors and real-time data associated with the one or more real-time factors. These factors may include map information, roadway information, geographic information, vehicle information, train information, bus route information, and/or additional factors that may influence determination of vehicle mode. The collection and storing of real-time data will allow for the development of a portfolio of historical data that may be used in improving the predictive analysis for determining the vehicle mode of a user.

In accordance with aspects of the disclosure, a sensor system may record, based on a user traveling during a trip, acceleration data and location data throughout the trip. In different aspects the user may be the operator of a vehicle during the trip, a passenger in a vehicle during the trip, or the operator of a vehicle during some segments of the trip and a passenger in a vehicle during other segments of the trip. The acceleration data and location data may be communicated to a server where it may be stored and/or analyzed. In some aspects, the server may receive current map data from an external database, a network, a server, or other source, and may perform analysis comparing the recorded acceleration data and location data to the received current map data to perform vehicle mode analysis. In accordance with certain aspects the system may perform a first vehicle mode analysis on the recorded acceleration data and location data, and subsequently perform a second vehicle mode analysis on the recorded acceleration data and location data to verify vehicle mode detection accuracy.

In accordance with some aspects of the disclosure, a sensor system may record, based on a user traveling during a trip, acceleration data and location data throughout the trip. The acceleration data and location data may be recorded by a mobile device, and may be stored and/or analyzed at the mobile device. In some aspects, the mobile device may receive current map data from an external database and store the current map data on the mobile device. In certain aspects portions of the map data or other data received from an external database may be cached at the mobile device. In these aspects, there are advantages to having the map data cached at the mobile device as it will improve efficiency and reduce the need for additional transfer of data. In some arrangements the mobile device may perform analysis comparing the recorded acceleration data and location data to the received and/or stored current map data to perform vehicle mode analysis. In accordance with certain aspects the system may perform a first vehicle mode analysis on the recorded acceleration data and location data, and subsequently perform a second vehicle mode analysis on the recorded acceleration data and location data to verify vehicle mode detection accuracy. In certain aspects the mobile device may cache the map data and be configured to perform the mode detection analysis at the mobile device without needing to communicate to an external server.

In some aspects the system may receive predefined route data from a map database system in order to determine travel routes for different vehicles types. In some aspects the system may receive routeway data. In some aspects the routeway data may include data specific to a routeway type. In some arrangements a routeway type may be data related to routes on which a particular vehicle operates. In some examples, a routeway type may be a train, and the routeway data may include data related to train tracks and/or train stations. In certain aspects, the routeway type may be a roadway, and the routeway data may include roadways, streets lights, stop signs, etc. In other aspects routeway data may include any combination of train tracks, roadways, waterways, bus routes, train stations, stop signs, street lights, bus stops, or any other routeway data affecting the route a vehicle may travel. In some aspects, the route data may be updated with real-time data, such as traffic data, train data, bus data, weather data, geography data, or any other data that may affect a vehicle's acceleration or location data while traversing a route.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

Figure 1:
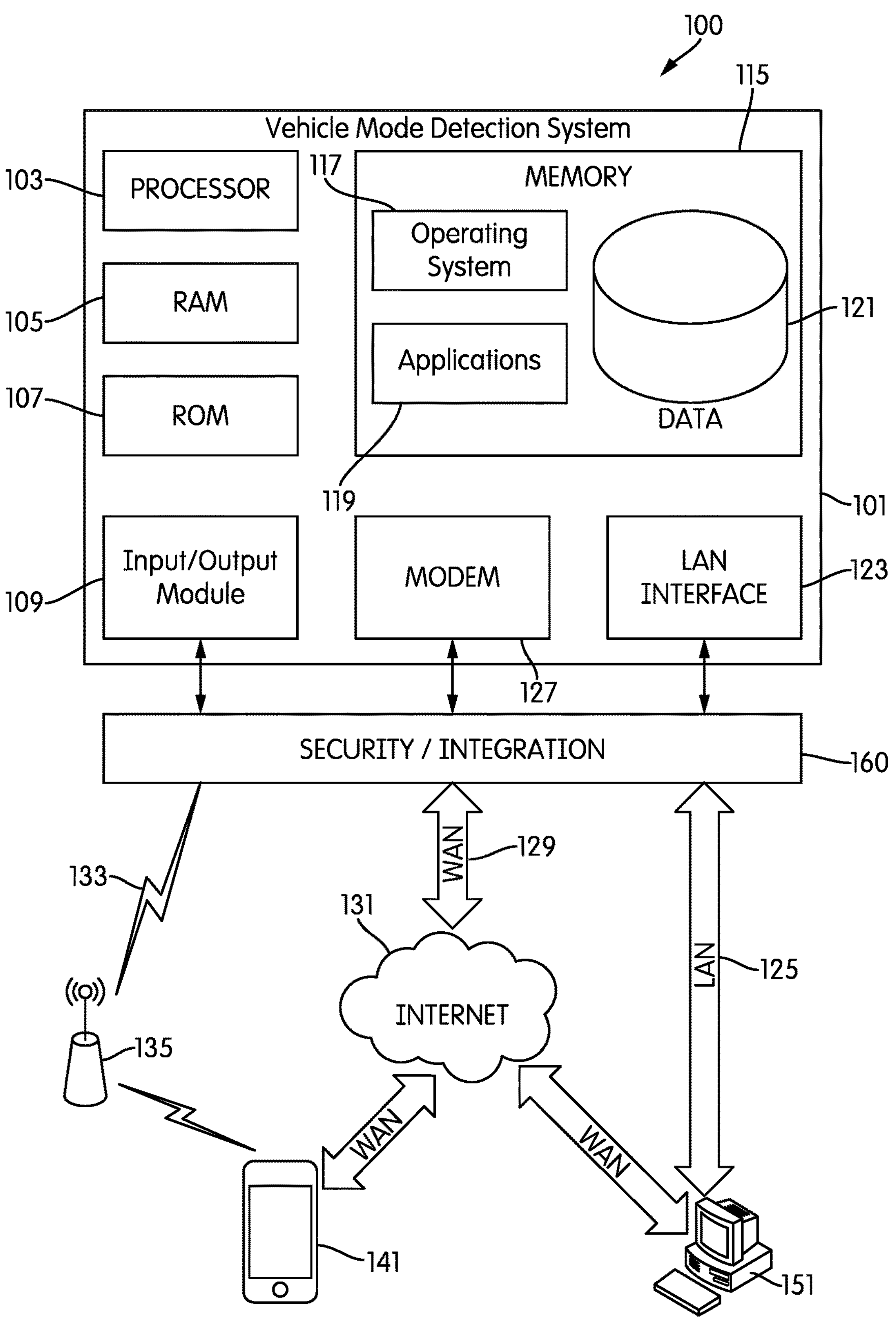
FIG. 1 illustrates a network environment and computing systems that may be used to implement aspects of the disclosure.

In the following description of the various embodiments, reference is made to the accompanying drawings, which form a part hereof, and in which is shown by way of illustration, various embodiments of the disclosure that may be practiced. It is to be understood that other embodiments may be utilized.

Aspects of the present disclosure are directed to the detection and measurement of acceleration data and location data during travel along route segments in order to detect the vehicle mode (e.g., mode of transportation) of the user while traversing these route segments. The techniques described in further detail below permit data to be collected while the user is operating a vehicle during a route, the user is a passenger in a vehicle during a route, or when the user may be the operator a vehicle during a portion of the route and a passenger in a vehicle during a portion of the route.

In many aspects of this disclosure, the terms travel segment and route segment are used to discuss a particular portion of a route being evaluated, which may include portions of a roadway, train track, waterway, or any other means on which a vehicle may travel. A route segment may include a road, portion of a road, path, bridge, on-ramp, off-ramp, train track, portion of a train track, river, or portion of any other route on which vehicles may travel. It should be noted many route segments allow a vehicle to travel in at least two directions. Further, the direction in which a vehicle is traveling may affect the vehicle's acceleration data, location data, and interaction with route segment obstacles or objects. In some examples a vehicle traveling one direction on a route segment may encounter various stopping points while a vehicle traveling in the opposite direction on a route segment may experience all, some, or none of those stopping points. For this reason, references to a route or route segment within this disclosure may refer to a specific direction of travel on that route segment, such that map data associated with a route or route segment indicates the data associated with one direction of travel along the route segment. Therefore, for example, analysis of the acceleration data and location data recorded along a trip will be analyzed with reference to a particular direction of travel. However, in various other arrangements, acceleration data and location data may be analyzed without reference to a particular direction of travel.

Throughout this disclosure reference is made to the terms trip, trip segment, and travel segment. As generally defined in this disclosure, a trip may generally refer to movement associated with a user navigating from a starting point to a destination (i.e., continuous movement segments, stopping occurrences, etc.). In some aspects a travel segment may generally refer to each period of continuous movement while a user is engaged in a trip. In other aspects a travel segment may refer to any portion of a trip associated with a particular vehicle mode. In different aspects the travel segment may include periods of acceleration, deceleration, braking, turning, stopping, or consistent velocity. In some aspects a trip may comprise a single travel segment. In other aspects, a trip may comprise any number of travel segments. It should be noted that a user may use multiple vehicles or types of vehicles (e.g., automobile, train, boat, airplane, bicycle, etc.) during a trip, but each travel segment may be associated with a single vehicle. In some examples, each travel segment may only be associated with a single vehicle. For example, a user who commutes may drive from their house to a train station, and then ride a train from that station to their office. A trip would comprise the entire process of travelling from the user's house to the user's office. The trip would include the use of both a car and a train as vehicles during the trip. However, the car ride would be a first individual travel segment and the train ride would be a second individual travel segment. It should be noted that processes discussed herein may discuss detecting a vehicle mode associated with a trip or travel segment, sometimes interchangeably. This should not limit the disclosure. It should be noted that trips often comprise more than one travel segment and processes of detecting a vehicle mode associated with a trip may also include processes of detecting a vehicle mode associated with one or more travel segments of the trip, even if not explicitly stated.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more non-transitory computer-readable storage media having computer-readable program code, or instructions, embodied in or on the storage media. Any suitable computer-readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 illustrates a block diagram of a vehicle mode detection system 101 in a sensor data analysis system 100 that may be used according to one or more illustrative embodiments of the disclosure. The vehicle mode detection system 101 may have a processor 103 for controlling overall operation of the vehicle mode detection system 101 and its associated components, including RAM 105, ROM 107, input/output module 109, and memory 115. The vehicle mode detection system 101, along with one or more additional devices (e.g., terminals 141, 151) may correspond to any of multiple systems or devices, such as mobile computing devices (e.g., smartphones, smart terminals, tablets, and the like) and/or vehicular-based computing devices, configured as described herein for collecting and analyzing sensor data from mobile devices associated with vehicles, particularly acceleration data and location data.

Input/Output (I/O) 109 may include a microphone, keypad, touch screen, and/or stylus through which a user of the vehicle mode detection system 101 may provide input, and may also include one or more of a speaker for providing audio output and a video display device for providing textual, audiovisual and/or graphical output. Software may be stored within memory 115 and/or storage to provide instructions to processor 103 for enabling vehicle mode detection system 101 to perform various functions. For example, memory 115 may store software used by the vehicle mode detection system 101, such as an operating system 117, application programs 119, and an associated internal database 121. Processor 103 and its associated components may allow the vehicle mode detection system 101 to execute a series of computer-readable instructions to transmit or receive vehicle location and acceleration data, analyze location and acceleration data, and store analyzed data.

The vehicle mode detection system 101 may operate in a networked environment supporting connections to one or more remote computers, such as terminals/devices 141 and 151. Vehicle mode detection system 101, and related terminals/devices 141 and 151, may include devices installed in vehicles, mobile devices that may travel within vehicles, or devices outside of vehicles that are configured to receive and process vehicle location and acceleration data. Thus, the vehicle mode detection system 101 and terminals/devices 141 and 151 may each include personal computers (e.g., laptop, desktop, or tablet computers), servers (e.g., web servers, database servers), vehicle-based devices (e.g., onboard vehicle computers, short-range vehicle communication systems, telematics devices), or mobile communication devices (e.g., mobile phones, portable computing devices, and the like), and may include some or all of the elements described above with respect to the vehicle mode detection system 101.

The network connections depicted in FIG. 1 include a local area network (LAN) 125 and a wide area network (WAN) 129, and a wireless telecommunications network 133, but may also include other networks. When used in a LAN networking environment, the vehicle mode detection system 101 may be connected to the LAN 125 through a network interface or adapter 123. When used in a WAN networking environment, the vehicle mode detection system 101 may include a modem 127 or other means for establishing communications over the WAN 129, such as network 131 (e.g., the Internet). When used in a wireless telecommunications network 133, the vehicle mode detection system 101 may include one or more transceivers, digital signal processors, and additional circuitry and software for communicating with wireless computing devices 141 (e.g., mobile phones, short-range vehicle communication systems, vehicle telematics devices) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices vehicle mode detection system components described herein may be configured to communicate using any of these network protocols or technologies.

Also illustrated in FIG. 1 is a security and integration layer 160, through which communications may be sent and managed between the vehicle mode detection system 101 (e.g., a user's personal mobile device, a vehicle-based system, external server, etc.) and the remote devices (141 and 151) and remote networks (125, 129, and 133). The security and integration layer 160 may comprise one or more separate computing devices, such as web servers, authentication servers, and/or various networking components (e.g., firewalls, routers, gateways, load balancers, etc.), having some or all of the elements described above with respect to vehicle mode detection system 101. As an example, a security and integration layer 160 of a mobile computing device, vehicle-based device, or a server operated by an insurance provider, financial institution, governmental entity, or other organization, may comprise a set of web application servers configured to use secure protocols and to insulate the vehicle mode detection system 101 from external devices 141 and 151. In some cases, the security and integration layer 160 may correspond to a set of dedicated hardware and/or software operating at the same physical location and under the control of same entities as vehicle mode detection system 101. For example, layer 160 may correspond to one or more dedicated web servers and network hardware in an organizational datacenter or in a cloud infrastructure supporting a cloud-based vehicle mode detection system. In other examples, the security and integration layer 160 may correspond to separate hardware and software components which may be operated at a separate physical location and/or by a separate entity.

As discussed below, the data transferred to and from various devices in sensor data analysis system 100 may include secure and sensitive data, such as driving data, driving locations, vehicle data, and confidential individual data such as insurance data and medical data associated with vehicle occupants. In at least some examples, transmission of the data may be performed based on one or more user permissions provided. Therefore, it may be desirable to protect transmissions of such data by using secure network protocols and encryption, and also to protect the integrity of the data when stored in a database or other storage in a mobile device, analysis server, or other computing devices in the sensor data analysis system 100, by using the security and integration layer 160 to authenticate users and restrict access to unknown or unauthorized users. In various implementations, security and integration layer 160 may provide, for example, a file-based integration scheme or a service-based integration scheme for transmitting data between the various devices in the sensor data analysis system 100. Data may be transmitted through the security and integration layer 160, using various network communication protocols. Secure data transmission protocols and/or encryption may be used in file transfers to protect to integrity of the driving data, for example, File Transfer Protocol (FTP), Secure File Transfer Protocol (SFTP), and/or Pretty Good Privacy (PGP) encryption.

In other examples, one or more web services may be implemented within the vehicle mode detection system 101, in the sensor data analysis system 100 and/or the security and integration layer 160. The web services may be accessed by authorized external devices and users to support input, extraction, and manipulation of the data (e.g., driving data, location data, confidential personal data, etc.) between the vehicle mode detection system 101 in the sensor data analysis system 100. Web services built to support the sensor data analysis system 100 may be cross-domain and/or cross-platform, and may be built for enterprise use. Such web services may be developed in accordance with various web service standards, such as the Web Service Interoperability (WS-I) guidelines. In some examples, a movement data and/or driving data web service may be implemented in the security and integration layer 160 using the Secure Sockets Layer (SSL) or Transport Layer Security (TLS) protocol to provide secure connections between servers (e.g., the vehicle mode detection system 101) and various clients 141 and 151 (e.g., mobile devices, data analysis servers, etc.). SSL or TLS may use HTTP or HTTPS to provide authentication and confidentiality.

In other examples, such web services may be implemented using the WS-Security standard, which provides for secure SOAP messages using XML encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

In some aspects, various elements within memory 115 or other components in sensor data analysis system 100, may include one or more caches, for example, CPU caches used by the processing unit 103, page caches used by the operating system 117, disk caches of a hard drive, and/or database caches used to cache content from database 121. For embodiments including a CPU cache, the CPU cache may be used by one or more processors in the processing unit 103 to reduce memory latency and access time. In such examples, a processor 103 may retrieve data from or write data to the CPU cache rather than reading/writing to memory 115, which may improve the speed of these operations. In some examples, a database cache may be created in which certain data from a database 121 (e.g., a driving database, a vehicle database, insurance customer database, etc.) is cached in a separate smaller database on an application server separate from the database server. For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of retrieving driving, vehicle data, and individual data, such as faster response times and less dependence on network conditions when transmitting/receiving acceleration and location data evaluation software applications (or application updates), travel data, vehicle and occupant data, etc.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computer devices and system components described herein may be configured to communicate using any of these network protocols or technologies.

Additionally, one or more application programs 119 may be used by the vehicle mode detection system 101 within a sensor data analysis system 100 (e.g., vehicle mode software applications, device configuration software applications, and the like), including computer executable instructions for receiving and storing data from vehicle-based systems, and/or mobile computing devices, analyzing the data to determine a potential vehicle mode associated with a particular travel segment and/or trip, retrieving various acceleration data and location data relating to the travel segment and/or trip, determining and configuring the mobile computing device based on the retrieved and analyzed data, and/or performing other related functions as described herein.

Figure 2:
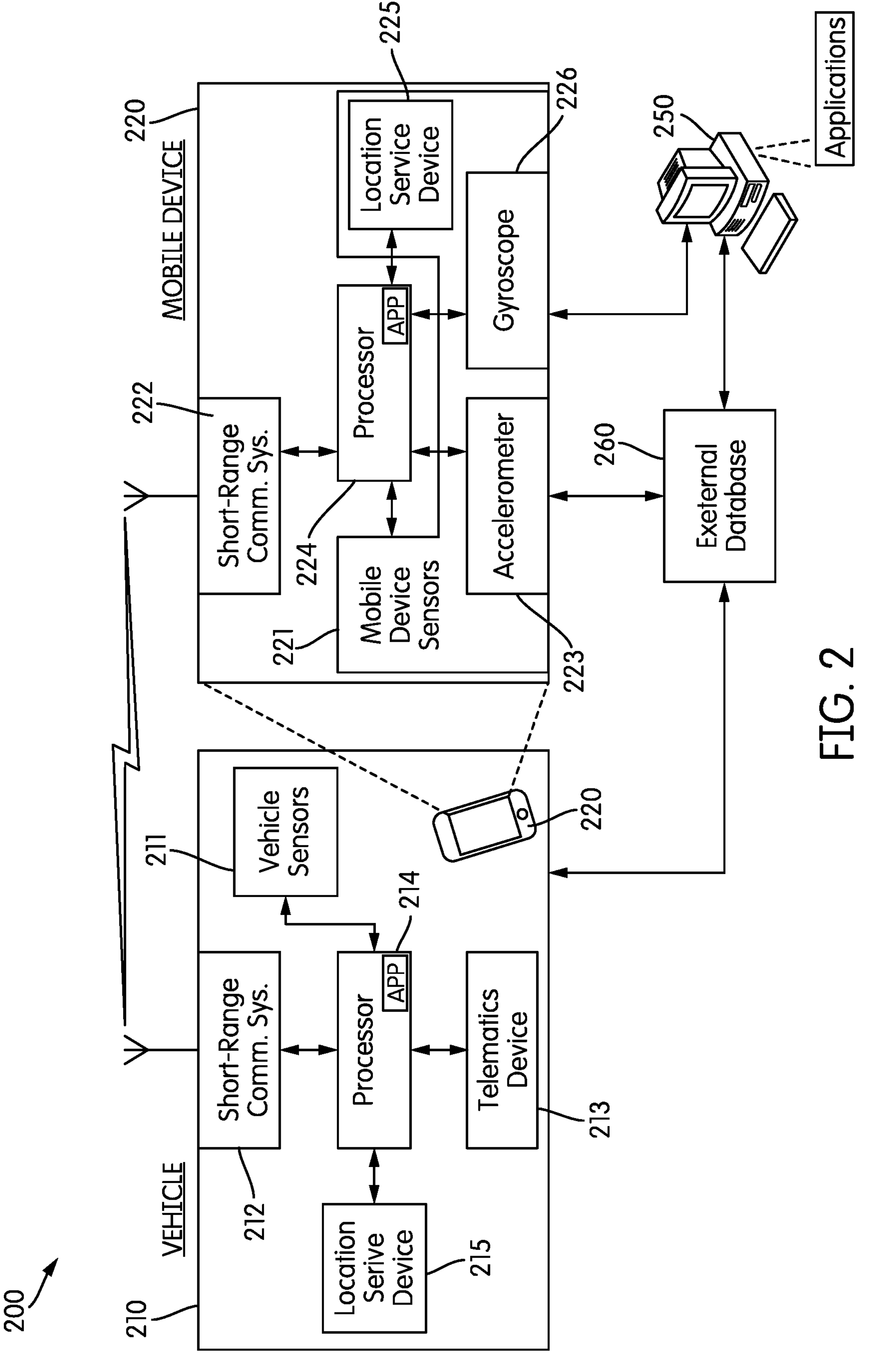
FIG. 2 is a diagram illustrating various example components of a vehicle mode detection system according to one or more aspects of the disclosure.

FIG. 2 is a diagram of an illustrative vehicle mode detection system 200 including a vehicle 210 and a mobile device 220 and additional related components. Each component shown in FIG. 2 may be implemented in hardware, software, or a combination of the two. Additionally, each component of the vehicle mode detection system 200 may include a computing device (or system) having some or all of the structural components described above for vehicle mode detection system 101. The illustration of a single mobile device is exemplary and any number of mobile devices may be present in the vehicle mode detection system 200.

Vehicle 210 in vehicle mode detection system 200 may be, for example, an automobile, motorcycle, scooter, bus, train, monorail, airplane, boat, or any other vehicle for which vehicle location data and acceleration data may be analyzed. The vehicle 210 may include vehicle operation sensors 211 capable of detecting and recording various conditions at the vehicle and operational parameters of the vehicle. For example, sensors 211 may detect and store data corresponding to the vehicle's location (e.g., GPS coordinates), speed and direction, rates of acceleration or braking, and specific instances of sudden acceleration, braking, and swerving. Sensors 211 also may collect information regarding the user's route choice, whether the user follows a given route, and to classify the type of trip (e.g. commute, errand, new route, etc.) and vehicle mode. This may be in combination with a location service device 215 which is connected to a location service. The location service device 215 may be, for example, one or more devices receiving Global Positioning System (GPS) data or other locational sensors positioned inside the vehicle 210, and/or locational sensors or devices external to the vehicle 210 which may be used determine the route or position of the vehicle.

Mobile device 220 in the vehicle mode detection system 200 may be, for example, any mobile device, such as a smartphone, tablet computing device, personal digital assistant (PDA), smart watch, netbook, laptop computer, and other like devices. The mobile device 220 may include a set of mobile device sensors 221, which may include, for example, gyroscope 226, accelerometer 223, and location detection device 225. The mobile device sensors 221 may be capable of detecting and recording various conditions at the mobile device 220 and operational parameters of the mobile device 220. For example, sensors 221 may detect and store data corresponding to the mobile device's location (e.g., GPS coordinates), speed and direction in one or multiple axes (forward and back, left and right, and up and down for example), rates of acceleration or deceleration, and specific instances of sudden acceleration, deceleration, and lateral movement. Sensors 221 may include audio sensors, video sensors, signal strength sensors, communication network-presence sensors, ambient light sensors, temperature/humidity sensors, barometer sensors, and may detect and store relevant data, such as data which may be indicative of entering or exiting a vehicle. This may include for example, listening for audio signals indicating a door locking/unlocking, a door opening/close, door chime, or vehicle ignition, sensing light from an overhead or dashboard light, detecting a temperature or humidity change indicative of entering a vehicle, listening for audio signals indicating a human voice, such as a train conductor or overhead speaker, detecting a presence of a network or communication device associated with a vehicle (e.g., a BLUETOOTH transceiver associated with a vehicle), and other data collected by the mobile device's sensors.

Software applications executing on mobile device 220 may be configured to detect certain travel data independently using mobile device sensors 221. For example, mobile device 220 may be equipped with movement and location sensors, such as an accelerometer 223, gyroscope 226, speedometer, location service device 225, which may include GPS receivers, and may determine vehicle location, speed, acceleration, direction and other basic travel data without needing to communicate with the vehicle sensors 211, or any vehicle system. In other examples, software on the mobile device 220 may be configured to receive some or all of the travel data collected by vehicle sensors 211.

Additional sensors 221 may detect and store external conditions which may indicate presence within a vehicle. For example, audio sensors and proximity sensors 221 may detect other nearby mobile devices, traffic levels, road conditions, traffic obstructions, animals, cyclists, pedestrians, speakers, ambient noise, and other conditions that may factor into a vehicle mode determination analysis. In other examples audio sensors and proximity sensors 211 located in the vehicle may detect other nearby mobile devices, traffic levels, road conditions, traffic obstructions, animals, cyclists, pedestrians, speakers, ambient noise, and other conditions that may factor into a vehicle mode determination analysis. In different aspects the sensors 211 and 221 may both detect and store external conditions and may be configured to communicate detections between the vehicle 210 and mobile device 220.

Certain mobile device sensors 221 also may collect information regarding the user's route choice, whether the user follows a given route, and to classify the type of trip (e.g. commute, errand, new route, etc.). This may be in combination with a location service device 225 which is connected to a location service. The location service device 225 may be, for example, one or more devices receiving GPS data, or may be other device(s) or other locational sensors positioned at the mobile device 220. This route choice data may be stored and used in analysis of future travel segment data for vehicle mode detection.

Data collected by the mobile device sensors 221 may be stored and/or analyzed within the mobile device 220, and/or may be transmitted to one or more external devices for analysis. Similarly, data collected by the vehicle sensors 211 may be stored and/or analyzed within the vehicle 210, and/or may be transmitted to one or more external devices for analysis. For example, as shown in FIG. 2, sensor data may be exchanged (uni-directionally or bi-directionally) between vehicle 210 and mobile device 220 via, in some examples, short-range communication systems 212 and 222. Additionally, in some aspects the sensor data may be transmitted from the vehicle 210 to one or more remote computing devices, such as vehicle mode detection server 250, via a telematics device 213, and/or via a communication interface and communication system. In further aspects the sensor data may be transmitted from the mobile device 220 to one or more remote computing devices, such as vehicle mode detection server 250, via a communication interface and communication system.

The state or usage of the vehicle's 210 controls and instruments may also be transmitted to the mobile device 220, for example, as well as whether the vehicle is accelerating, braking, turning, and by how much, and/or which of the vehicle's instruments are currently activated by the user or by the operator (e.g., turn signals, cruise control, lane assist, and so on.). In various other examples, any data collected by any vehicle sensors 211 potentially may be transmitted. Further, additional vehicle traveling data not from the vehicle's sensors (e.g., vehicle make/model/year information, driver insurance information, driving route information, vehicle maintenance information, driver scores, and so on) may be collected from other data sources, such as a driver's or passenger's mobile device 220.

In certain examples, mobile device 220 may periodically collect sets of travel data at an internal processor 224, such as data from an accelerometer 223 and/or location data from location service device 225, such as a GPS receiver or the like. In some aspects these sets of data may be collected and recorded at predetermined intervals, such as every second, every five seconds, every 10 seconds, or any other time interval. In further aspects these sets of data may be collected and recorded upon the detection of certain data events, such as collecting and recording data sets upon detecting acceleration greater than a defined threshold. In some aspects this threshold may be 1 $m/s^2$, 2 $m/s^2$, 0.5 $m/s^2$, etc. In further aspects the data sets may be collected and recorded upon detecting an acceleration of 0 $m/s^2$. In some arrangements the data sets may be collected and recorded at variations and combinations of these events, such that in some examples data sets will be collected and recorded at predetermined intervals and upon detection of certain data events. While reference is made throughout this disclosure to acceleration data, in many aspects data collected from an accelerometer 223 may include acceleration data, velocity data, or both. Therefore whenever reference is made to acceleration data throughout this disclosure, it should be understood that acceleration data may include, and in some instances be solely comprised of, velocity data.

In certain aspects portions of the map data or other data received from an external database may be cached at the mobile device 220 and analyzed at the internal processor 224. In these aspects, there are advantages to having the map data cached at the mobile device as the mobile device may perform analysis comparing the recorded acceleration data and location data to the received and/or stored current map data to perform vehicle mode analysis without needing to communicate the recorded acceleration data and location data. In accordance with certain aspects the system may perform a first vehicle mode analysis on the recorded acceleration data and location data, and subsequently perform a second vehicle mode analysis on the recorded acceleration data and location data to verify vehicle mode detection accuracy. In certain aspects the mobile device 220 may perform both the first vehicle mode analysis and the second vehicle mode analysis at the internal processor 224 without needing to communicate to the server 250. Further, cache data may be analyzed and communicated more quickly such that the vehicle mode system operates more efficiently.

As shown in FIG. 2, the data collected by mobile device sensors 221 also may be transmitted to an external source, such as a vehicle mode detection server 250, and one or more additional external servers and devices via communication devices/interfaces. The communications devices may be computing devices containing many or all of the hardware/software components as the vehicle mode detection system 101 depicted in FIG. 1. As discussed above, the communication devices/interfaces may receive travel and/or vehicle operation data from mobile device sensors 221, and may transmit the data to one or more external computer systems (e.g., a vehicle mode detection server 250 of an insurance company, financial institution, or other entity) over a wireless transmission network. The communication devices/interfaces also may be configured to detect or determine additional types of data relating to real-time traveling and movement data associated with the mobile device sensors 221. In certain embodiments, the communication devices/interfaces may contain or may be integral with one or more of the mobile device sensors 221.

In some aspects, the vehicle 210 may be owned and operated by the user. The telematics device 213 also may be configured to detect or determine additional types of data relating to real-time traveling and movement data and/or the condition of the vehicle 210. In further aspects, the telematics device 213 also may store the type of its respective vehicle 210, for example, the vehicle mode, make, model, trim (or sub-model), year, and/or engine specifications, as well as other information such as vehicle owner or driver information, insurance information, and financing information for the vehicle 210. In some aspects the telematics device 213 may be a tag telematics device that is separate from a vehicle but configured to detect or determine data (e.g., via one or more sensors within the tag telematics device or from sensors within a vehicle, mobile device, or the like) while being present in a vehicle or coupled to a vehicle. In certain aspect the tag telematics device may be configured to couple to a vehicle through an adhesive, mechanical coupling system, magnets, or any other coupling mechanism. In some aspects, the presence of the tag telematics device may be sufficient to collect data while coupled to a vehicle or while in the interior of the car, such as with a user or elsewhere in the car, such as in the glove compartment. In some aspects the tag telematics device does not need to be fixed or coupled to the car. In some aspects the tag telematics device may be configured to communicate to a mobile device 220, to a server 250, or to both.

In the example shown in FIG. 2, telematics device 213 may receive travel data, including acceleration, velocity, location, and other travel data, from vehicle sensors 211, and may transmit the data to a vehicle mode detection server 250. However, in other examples, data may be directly transmitted from the sensors 211 to the vehicle mode detection server 250 or other device (e.g., mobile device 220).

In some arrangements, one or more of the mobile device sensors 221 may be configured to transmit data directly to a vehicle mode detection server 250 without using a telematics device. In other examples, sensor data may be transmitted to the vehicle 210 (e.g., in addition to or in the alternative to short-range communication system 212/222). Vehicle 210 may be configured to receive and transmit data from certain mobile device sensors 221. In other examples, one or more of the mobile device sensors 221 may be configured to transmit data to the vehicle 210 via communication devices/interfaces. In some aspects, mobile device sensors 221 may be configured to directly transmit data to a vehicle mode detection server 250. Vehicle 210 may be configured to transmit sensor data, including sensor data received at short-range communication system 212 and/or telematics device 213 to a mobile device 220 and/or to a vehicle mode detection server 250.

In certain embodiments, mobile device 220 may be used to collect vehicle traveling data and/or mobile device data from sensors 211 and 221, and then used to transmit the vehicle traveling data to vehicle mode detection server 250 and other external computing devices directly. As used herein, mobile computing devices 220 "within" the vehicle 210 include mobile devices 220 that are inside of or otherwise secured to a vehicle, for instance, in the cabins of automobiles, trains, buses, recreational vehicles, motorcycles, scooters, or boats, and mobile devices 220 in the possession of operators or passengers of such vehicles.

Vehicles 210 and mobile devices 220 may include vehicle mode detection applications as hardware, software and/or firmware components with processors 214 and 224, respectively (shown in FIG. 2 as "APP"). Alternatively, vehicle mode detection applications may be separate computing devices or may be integrated into one or more other components within the vehicle 210 and mobile device 220, such as the short-range communication systems 212 and 222, telematics device 213, or other internal computing systems of vehicle 210 and mobile device 220. The vehicle mode detection applications may contain some or all of the hardware/software components as the vehicle mode detection system 101 depicted in FIG. 1. Further, in certain implementations, the functionality of the vehicle mode detection applications, such as storing and analyzing vehicle traveling data, storing and analyzing mobile device based data, performing a vehicle mode detection analysis, and performing one or more follow-on actions, may be performed at a vehicle mode detection server 250 rather than by individual vehicle 210 and mobile device 220. In such implementations, the vehicle 210 and mobile device 220 might only collect and transmit data to vehicle mode detection server 250, and thus the vehicle mode detection applications within processors 214 and 224 may be optional.

Vehicle mode detection applications within processor 224 may be implemented in hardware and/or software configured to receive vehicle traveling data from vehicle sensors 211, mobile device sensors 221, short-range communication systems 212 and 222, telematics device 213, and/or other data sources. After receiving the data, vehicle mode detection applications within processor 224 may perform a set of functions to analyze the data and determine the vehicle mode associated with a data set. For example, the vehicle mode detection applications within processor 224 may include one or more positioning algorithms, acceleration algorithms, machine learning algorithms, and device detection algorithms, which may be executed by software running on hardware within the vehicle mode detection applications. The vehicle mode detection application within processor 224 in a mobile device 220 may use the location data and acceleration data received from mobile device sensors 221 (and/or sensors 211), to determine a vehicle mode associated with the mobile device 220. In some aspects the vehicle mode associated with the mobile device 220 may occur while the mobile device 220 is within the interior of the vehicle 210. In different aspects the vehicle mode associated with the mobile 220 device may be determined for a particular route or travel segment of a single trip. Further descriptions and examples of the algorithms, functions, and analyses that may be executed by the vehicle mode detection applications within processor 224 are described below in reference to FIGS. 3-8.

The system 200 also may include a vehicle mode detection server 250, containing some or all of the hardware/software components as the vehicle mode detection system 101 depicted in FIG. 1. The vehicle mode detection server 250 may include hardware, software, and network components to receive vehicle traveling and/or operational data from vehicle 210 and mobile devices 220, and other data sources. The vehicle mode detection server 250 may include databases and vehicle mode detection applications to respectively store and analyze location data and acceleration data received from mobile device 220 and other data sources. The vehicle mode detection server 250 may initiate communication with and/or retrieve driving data from mobile device 220 wirelessly (e.g., via a cellular network, Bluetooth or other connection, or the like), or by way of separate computing systems over one or more computer networks (e.g., the Internet). Additionally, the vehicle mode detection server 250 may receive additional data relevant to vehicle mode detection analysis from other non-mobile device or external databases, such as external database 260. In some examples the external database may be an external map databases containing route data (e.g., roadways, street lights, stop signs, intersections, train tracks, train sections, waterways, docks, etc.), transportation databases containing transportation data (e.g., amounts of road traffic, train delays, average vehicle speed, vehicle speed distribution, and numbers and types of accidents, etc.) at various times and locations, external infrastructure elements (e.g., network elements of a data or telecommunications network such as a cellular telephone or data network), and the like.

The vehicle mode detection applications within the vehicle mode detection server 250 may be configured to retrieve data from the local database, or may receive travel data directly from mobile device 220, vehicle 210, other data sources, or combinations thereof, and may perform functions such as determining a location of the mobile device 220 at different points during a trip, determining stopping points of the mobile device 220 during a trip, determining acceleration actions above a threshold of the mobile device 220 during a trip, performing post-collection processing, and other related functions. The functions performed by the vehicle mode detection applications may be similar to those of vehicle mode detection applications within processors 214 and 224, and further descriptions and examples of the algorithms, functions, and analyses that may be executed by the vehicle mode detection applications are described below in reference to FIGS. 3-8.

In various examples, the analyses and actions performed within vehicle mode detection applications may be performed entirely in the vehicle mode detection applications of the vehicle mode detection server 250 (in which case vehicle mode detection applications within processors 214 and 224 need not be implemented in vehicle 210 and mobile device 220), may be performed entirely in the mobile device-based application within processor 224 (in which case the vehicle mode detection application and/or the server 250 need not be implemented), or in some combination of the two. For example, a device-based application within processor 224 may continuously receive and analyze data and determine a change in position or acceleration of the mobile device 220 has not changed, so that large or repetitive amounts of data need not be transmitted to the server 250. However, after an excessive change in position or acceleration is detected (e.g., because the mobile device has begun moving from a stopping point) the data may be transmitted to the server 250, and the applications thereof may determine if the execution of one or more actions is required.

FIGS. 3-8 show illustrative example flowcharts of algorithms, functions, analyses, methods, and processes that may be used in embodiments described herein to detect a vehicle mode associated with a trip or travel segment. These flowcharts generally describe embodiments where data is collected throughout a trip, communicated to a server, and analyzed at that server. However, all embodiments, algorithms, functions, analyses, methods, processes, and steps may be performed at any device capable of doing so, such as processors 214 and 224, vehicle mode detection server 250, or any other computing device. Any reference to a function being performed by a particular server in these flowcharts should be understood to be capable of being performed at any other server or processor discussed in this disclosure. This disclosure is not limited by the embodiments recited in the illustrative flowcharts. These flowcharts are merely to illustrate example embodiments in which the disclosures discussed herein may be performed.

FIGS. 3-8 illustrate example embodiments for methods of using acceleration data and location data to determine a vehicle mode associated with a trip. The steps shown in these example flow charts may be executed by a single computing device, such as mobile device processor 224 or vehicle mode detection server 250. Alternatively, execution of the steps shown in the flow charts may be distributed between mobile device processor 224 and vehicle mode detection server 250. The illustrated methods may perform steps at regular time intervals (i.e. every 0.5 seconds, every second, every two seconds, every ten seconds, every fifteen seconds etc.), at irregular intervals, on-demand in response to input received from a user, or combinations thereof. In some aspects the steps will be performed in order, but in other aspects steps may be performed in a different order or concurrently. For example, in some embodiments, acceleration data and location data may be collected throughout the trip, but may be communicated to a processor 224 or vehicle mode detection server 250 at set intervals where the data is analyzed. In this example, the server may be analyzing data while acceleration data and location data is continuing to be recorded throughout the remainder of the trip.

In each of the embodiments illustrated in FIGS. 3-8, the first two steps are essentially the same. As such, the following discussion of collecting acceleration data and location data during a trip, and communicating acceleration data and location data to a server applies equally to all embodiments illustrated in the flowcharts shown in FIGS. 3-8, and may apply to aspects not explicitly shown in such figures.

Figure 3:
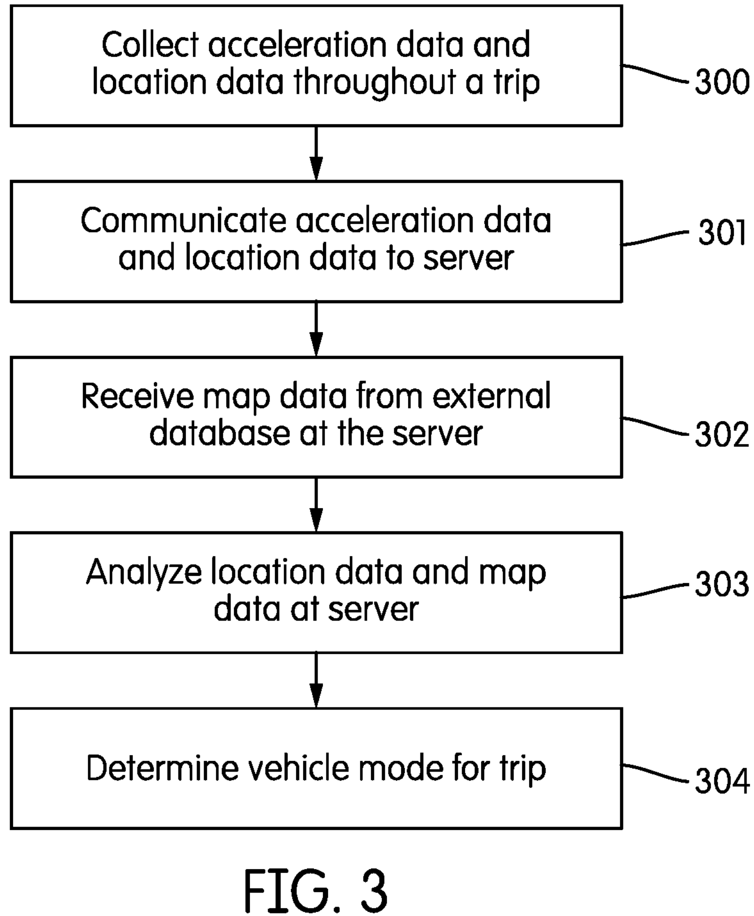
FIG. 3 is a flow diagram illustrating an example method of collecting acceleration data and location data and analyzing it to determine a vehicle mode according to one or more aspects of the disclosure.

FIG. 3 illustrates an example flowchart in which acceleration data and location data are collected during a trip and analyzed to determine a vehicle mode associated with the trip. In some embodiments, acceleration data and location data may be collected throughout a trip, as shown in step 300. In some examples, a mobile device 220 may collect acceleration data and location data throughout a trip. As discussed with respect to FIG. 2, the acceleration data and location data may be collected by mobile device sensors 221. In some aspects the acceleration data may be collected by an accelerometer 223 and the location data may be collected by a location service device 225. In other aspects acceleration data and location data may be collected by a vehicle 210 during a trip. In some examples acceleration data and location data may be collected by multiple sources during a trip, such as vehicle 210 and/or mobile device 220. In some arrangements the acceleration data and location data will be collected continuously, at regular time intervals, irregular time intervals, or on-demand in response to input received from a user. In other aspects the acceleration data and location data may be collected in multiple manners, such as at regular time intervals and on-demand in response to input received from a user. The acceleration data and location data may be recorded upon collection, such as at a processor 224. The acceleration data and location data may be recorded every time it is collected, or only upon certain events. In some examples the acceleration data and location data may be collected, but only recorded if the location data has changed, the acceleration data has changed, the acceleration data is above a certain threshold, the acceleration data is below a certain threshold, or combinations thereof.

In step 301, the acceleration data and location data may be communicated to a server or other computing device configured to perform vehicle mode analysis. In some aspects this step may be performed by recording the acceleration data and location data at a processor 224. In other aspects this step may be performed by communicating the acceleration data and location data to the vehicle mode detection server 250. In other aspects the acceleration data and location data may be recorded at a processor 224 and communicated to the vehicle mode detection server 250 either concurrently or at different times. The acceleration data and location data may be communicated to a server at regular time intervals, at irregular time intervals, on-demand in response to input received from a user, or combinations thereof.

In step 302, the vehicle mode detection server 250 may receive map data from an external database, such as external database 260 shown in FIG. 2. In some aspects the map data may include routeway data (i.e., roadway data, street light data, stop sign data, train track data, train station data, waterway data, port data, traffic data, weather data, geography data, and any other data that may affect a vehicle while traversing a route). In some aspects the map data may be received from one external database, two external databases, or any number of external databases. In some aspects a first set of map data may be received from a first external database and a second set of map data may be received from a second external database. In other aspects the vehicle mode detection server 250 may receive any combination of one or more data sets from one or more external databases. In some aspects the vehicle mode detection server 250 may receive map data, such as roadway files and/or train track files from one or more external databases 260 such as the Department of Transportation, public open sources, academic institutions, open data portal, public research groups, or combinations therein. After the vehicle mode detection server 250 receives the map data, it may analyze the location data and map data at the vehicle mode detection server 250 in step 303. In some aspects, the server 250 may analyze the location data collected during a trip and routeway data received from an external database 260. In some aspects the routeway data may comprise data for a routeway type. In certain aspects the routeway type may be train tracks, roadways, waterways, etc. In one example the routeway type may be train tracks, and the routeway data may comprise train track data and train station data. In some aspects, the server 250 may determine a snapping distance to a train track for each location data point collected during the trip. A snapping distance may be, in at least some examples, the shortest distance between a given location and a location meeting a specific criterion. As an example, a snapping distance to a train track may be defined as the distance between a location and the nearest location of a train track. In other embodiments a snapping distance may be calculated between a given location and a nearest train station, roadway, street sign, street light, waterway, or other criteria relating to vehicle route data. In some aspects, the server 250 may analyze location data collected throughout a trip and determine the average snapping distance to a train track throughout the trip. In certain aspects the average snapping distance to a train track may be compared to a threshold value to determine vehicle mode for the trip at 304. In some examples, if the average snapping distance to a train track is higher than the threshold value, the trip will be determined to be a road travel trip. In other examples, if the average snapping distance to a train track is lower than the threshold value, the trip will be determined to be a train travel trip. In some examples, this threshold value may be between 0 m and 100 m, between 10 m and 90 m, between 15 m and 20 m, greater than 5 m, less than 50 m, greater than 12 m, less than 30 m, or any value. In at least some examples the threshold value may be 17.8 m. In some aspects the threshold value may be changed based on additional data and model analysis. The threshold value may also depend on a variety of factors, such as map data, including train track file source, type of mobile device 220, geographic data, weather data, or any other factor potentially affecting the accuracy of location data, including combinations therein. The snapping distance may be determined for other routes, such as roadways or waterways, and the average snapping distance may be calculated and compared to a threshold in order to determine the vehicle mode associated with the trip. In step 304, the vehicle mode for the trip (or travel segment) may be determined based on the analysis.

Figure 4:
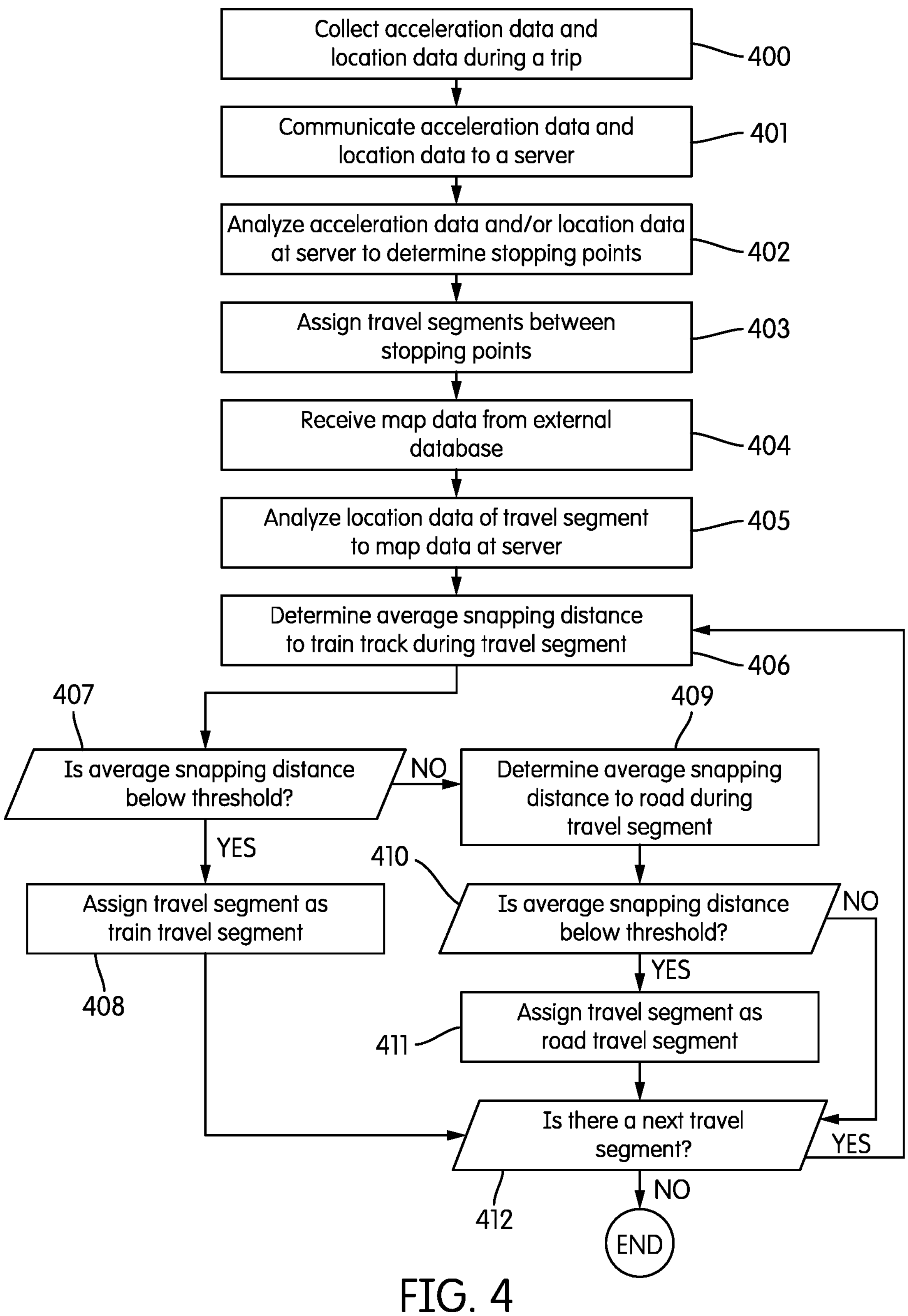
FIG. 4 is a flow diagram illustrating an example method of collecting acceleration data and location data and analyzing it to determine vehicle mode based on average snapping distance during a travel segment according to one or more aspects of the disclosure.

FIG. 4 is a flow chart illustrating one example method of using acceleration data and location data to determine a vehicle mode for travel segments by calculating an average snapping distance to a known route during a trip. In step 400, acceleration data and location data may be collected throughout the trip. Aspects of this step may be similar to those described above with respect to step 300 in FIG. 3. In step 401, the acceleration data and location data collected at step 400 may be communicated to a server. Aspects of this step may be similar to those described above with respect to step 301 in FIG. 3.

In step 402, the server may analyze the acceleration data to determine stopping points during the trip. A stopping point may be a period during the trip where the vehicle in which the user is traveling has a velocity of zero and is therefore determined to be not moving. A stopping point may also include one or more periods during a trip in which the vehicle has a velocity below a predetermined threshold. For instance, if the velocity is below a predetermined threshold (e.g., 5 mph, 3 mph, etc.) the system may identify that period as a stopping point, even though the vehicle has not made a complete stop. This may aid in accounting for periods in which a driver may not come to a complete stop, for instance, at a stop sign.

In some aspects the acceleration data may be analyzed to calculate when the vehicle's velocity is zero or below a threshold to determine stopping points. In some aspects the location data may be analyzed to determine stopping points. As one example, if consecutive location data points are the same, the system may determine the vehicle is at a stopping point. In further aspects, the accelerometer 223 may record velocity data during a trip. In these aspects the velocity data may be communicated to a server, which may be processor 224 or vehicle mode detection server 250. In these aspects the velocity data may be analyzed to determine stopping points during the trip. In different aspects the server may receive and analyze any combination of acceleration data, location data, and velocity data to determine stopping points.

After determining stopping points during the trip, the server may assign data points between consecutive stopping points as a travel segment as shown in step 403. A travel segment may include any portion of a trip in which a vehicle is moving. In other aspects a travel segment may refer to any portion of a trip. In different aspects the travel segment may include periods of acceleration, deceleration, braking, turning, stopping, or consistent velocity. It should be noted that any trip taken by a user may comprise a single travel segment or any number of travel segments. In step 404 the vehicle mode detection server 250 may receive map data from an external database, such as the external database 260 shown in FIG. 2. In some aspects the map data may include routeway data (i.e., roadway data, street light data, stop sign data, train track data, train station data, waterway data, port data, traffic data, weather data, geography data, and any other data that may affect a vehicle while traversing a route). In some aspects the map data may be received from one external database, two external databases, or any number of external databases. In some arrangements the vehicle mode detection server 250 may receive any combination of one or more data sets from one or more external databases. In some aspects the vehicle mode detection server 250 may receive map data, such roadway files and/or train track files from external databases 260 such as the Department of Transportation, public open sources, academic institutions, open data portal, public research groups, or combinations therein. In some aspects the map data received may be determined based on a predetermined routeway type. After the vehicle mode detection server 250 receives the map data, it may analyze the location data and map data at the vehicle mode detection server 250 in step 405. In some aspects, the server 250 may analyze the location data collected during a trip and data received from an external database 260, such as train track data. The server 250 may analyze these data sets to determine a snapping distance to a train track for each location data point collected during the travel segment. In step 406, the server 250 may analyze the location data collected throughout a travel segment and determine the average snapping distance to a train track throughout the travel segment. The average snapping distance to a train track may be compared to a threshold value and, at step 407, a determination may be made as to whether the average snapping distance is below the threshold value. In some aspects the average snapping distance to a train track threshold value may be between 0 m and 100 m, between 10 m and 90 m, between 15 m and 20 m, greater than 5 m, less than 50 m, greater than 12 m, less than 30 m, or any value. In some examples the threshold value may be 17.8 m. In some arrangements the threshold value may be changed based on additional data and model analysis. The threshold value may also depend on a variety of factors, such as map data, including train track file source, type of mobile device 220, geographic data, weather data, or any other factor potentially affecting the accuracy of location data, including combinations therein If, in step 407, the average snapping distance is below the threshold value, the method proceeds to step 408, and assigns the travel segment as a train travel segment. The process then continues to step 412 to determine whether additional travel segments should be analyzed. If so, the process may return to step 406 and analyze a next travel segment. If not, the process may end.

If, at step 407 however, the average snapping distance is not below the threshold, such that it may be equal to or greater than the threshold, the method proceeds to step 409 to determine an average snapping distance to a road for the travel segment. At this step, the location data may be analyzed and/or compared to map data received from an external database, such as road or roadway data. In some aspects the server 250 may first analyze the location data throughout the travel segment and determine a snapping distance to a roadway for each location data point collected during the travel segment. In further aspects, as shown in step 409, the server 250 may next analyze the location data collected throughout a travel segment and determine the average snapping distance to a roadway throughout the travel segment. In step 410, the average snapping distance to a roadway may be compared to a threshold and a determination may be made as to whether the average snapping distance is below the threshold. If the average snapping distance to a roadway is below the threshold, the process may assign the travel segment as a road travel segment in step 411. The process may then proceed to step 412 to determine whether there are additional travel segments to analyze, as discussed above.

If, at step 410 the average snapping distance to a roadway is not below the threshold, such that it may be equal or greater than the threshold, the method leaves the travel segment unassigned and proceeds directly to step 412 to determine whether there are additional travel segments to analyze. In some aspects the threshold value for average snapping distance to a roadway may be between 0 m and 100 m, between 10 m and 90 m, between 15 m and 20 m, greater than 5 m, less than 50 m, greater than 12 m, less than 30 m, or any value. In certain examples the threshold value may be 17.8 m. In certain aspects the threshold value may be changed based on additional data and model analysis. The threshold value may also depend on a variety of factors, such as map data, including train track file source, type of mobile device 220, geographic data, weather data, or any other factor potentially affecting the accuracy of location data, including combinations therein.

As discussed above, at step 412 the method determines whether there is a next travel segment associated with the trip. If there is not a next travel segment, the method ends. If there is another travel segment, the process may return to step 406 and perform the remaining steps for the data associated with the next travel segment.

Figure 5:
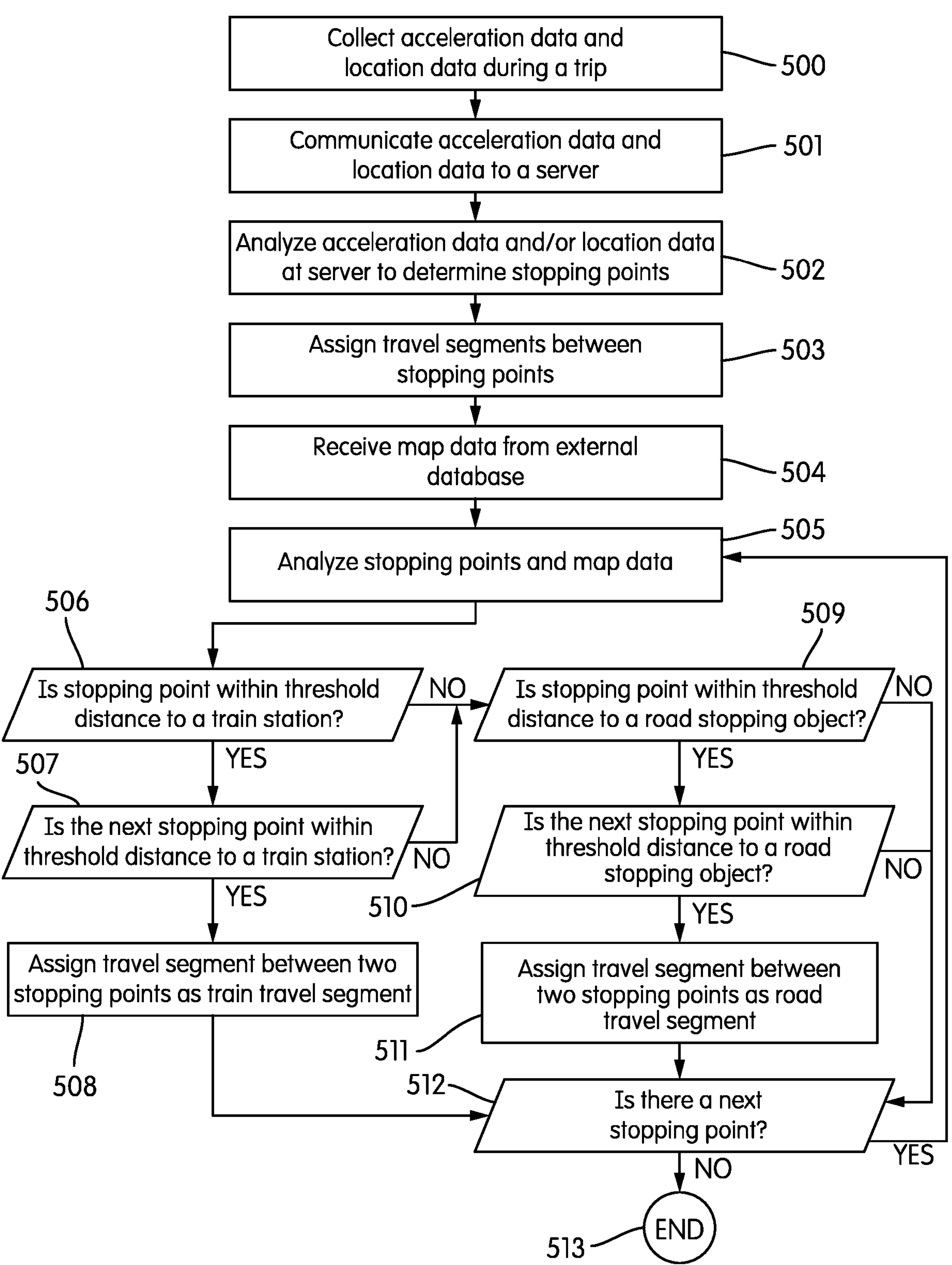
FIG. 5 is a flow diagram illustrating an example method of collecting acceleration data and location data and analyzing it to determine vehicle mode based on stopping points at the beginning and end of a travel segment according to one or more aspects of the disclosure.

FIG. 5 is a flowchart illustrating an example method using acceleration data and location data to determine a vehicle mode for travel segments by calculating an average snapping distance from stopping points during a trip to known routeway stopping objects. In step 500, acceleration data and location data may be collected throughout the trip. Aspects of this step may be similar to those described above with respect to step 300 in FIG. 3. In step 501, the acceleration data and location data collected at step 500 may be communicated to a server. Aspects of this step may be similar to those described above with respect to step 301 in FIG. 3.

In step 502, the server may analyze the acceleration data to determine stopping points during the trip. A stopping point may be defined as a period during the trip where the vehicle in which the user is traveling has a velocity of zero or below a threshold and is therefore not moving. A stopping point may also include one or more periods during a trip in which the vehicle has a velocity below a predetermined threshold. For instance, if the velocity is below a predetermined threshold (e.g., 5 mph, 3 mph, etc.) the system may identify that period as a stopping point, even though the vehicle has not made a complete stop. This may aid in accounting for periods in which a driver may not come to a complete stop, for instance, at a stop sign.

In some aspects the acceleration data may be analyzed to calculate when the vehicle's velocity is zero or below a threshold to determine stopping points. In some aspects the location data may be analyzed to determine stopping points. As one example, if consecutive location data points are the same, the system may determine the vehicle is at a stopping point. In further aspects, the accelerometer 223 may record velocity data during a trip. In these aspects the velocity data may be communicated to a server, which may be processor 224 or vehicle mode detection server 250. In these aspects the velocity data may be analyzed to determine stopping points during the trip. The server may receive and analyze any combination of acceleration data, location data, and velocity data to determine stopping points.

After determining stopping points during the trip, the server may assign data points between consecutive stopping points as a travel segment as shown in step 503. A travel segment may generally include one or more portion of a trip in which a vehicle is moving. In other aspects a travel segment may simply refer to a portion of a trip. In different aspects the travel segment may include periods of acceleration, deceleration, braking, turning, stopping, or consistent velocity. It should be noted that any trip taken by a user may comprise a single travel segment or any number of travel segments. In step 504, the vehicle mode detection server 250 may receive map data from an external database, such as the external database 260 shown in FIG. 2. In some aspects the map data may include routeway data (i.e., roadway data, street light data, stop sign data, train track data, train station data, waterway data, port data, traffic data, weather data, geography data, and any other data that may affect a vehicle while traversing a route). The map data may be received from one external database, two external databases, or any number of external databases. In some arrangements the vehicle mode detection server 250 may receive any combination of one or more data sets from one or more external databases. For instance, the vehicle mode detection server 250 may receive map data, such roadway files and/or train track files from an external database 260 such as the Department of Transportation, public open sources, academic institutions, open data portals, public research groups, or combinations therein. In some aspects the routeway data may comprise data for a routeway type. In certain aspects the routeway type may be train tracks, roadways, waterways, etc. In one example the routeway type may be train tracks, and the routeway data may comprise train track data and train station data. In other aspects, the routeway type may be roadways, and the routeway data may include roadways, streets lights, stop signs, etc.

After the receiving the map data, the vehicle mode detection server 250 may analyze the location data associated with stopping points and map data in step 505. In some aspects, the server 250 may analyze the location of stopping points and map data relating to routeway stopping objects. Routeway stopping objects may be objects that may cause a vehicle traveling along the routeway to stop or slow significantly from a travelling speed. In some arrangements routeway stopping objects may comprise permanent stopping objects (i.e., train stations, street lights, stop signs, parking lots, dock, ports, and anything else designed to stop a vehicle traveling along a routeway) In other aspects, the map data may include current dynamic stopping objects. Current dynamic stopping objects may be determined from map data relating to traffic, congestion, train delays, weather, hazards, etc. For example, the map data may include current data indicating that traffic on a roadway is congested to the point where vehicles are stopped. In this example, locations where traffic is stopped may be labeled a dynamic stopping object until the congestion clears. In other examples map data may include train delay data indicating that a train is stopped at a location between stations, indicating a dynamic stopping object.

The server 250 may analyze location data at stopping points and stopping object data to determine a distance to a stopping point object for each stopping point location. The stopping point object may be a single object, such as a street light, or may be a combination of objects. In some aspects the stopping point object may be all objects relating to the stopping of a particular vehicle mode. As such, a road stopping object may include street lights, street signs, traffic data, parking lots, and any other object that would indicating the stopping of an automobile on a roadway.

As shown in step 506, the server may determine a distance between a first stopping point and a train station, and at determination may be made as to whether that distance is within a predetermined threshold. In some examples the threshold distance for distance to a train station may be between 0 m and 100 m, between 10 m and 90 m, between 15 m and 20 m, greater than 5 m, less than 50 m, greater than 12 m, less than 30 m, or any other value. The threshold value may be changed based on additional data and/or model analysis. The threshold distance may also depend on a variety of factors, such as map data, including train track file source, type of mobile device 220, geographic data, weather data, or any other factor potentially affecting the accuracy of location data, including combinations therein.

If, in step 506, the distance is within the threshold distance, i.e., lower than the threshold, the method proceeds to step 507. At step 507, the server may analyze a second consecutive stopping point in the data and a determination may be made as to whether the second consecutive stopping point is within a threshold distance to the train station. The second consecutive stopping point may be the next stopping point after the first stopping point and after uninterrupted travel. In some aspects the threshold distance may be different for the first stopping point and the second stopping point. In other examples, the threshold may be the same. If, in step 507, the distance is within the threshold, the method may proceed to step 508 and assign the travel segment between the first and the second stopping points as a train travel segment. The process may then proceed to step 512 to determine whether there is another stopping point for analysis. If not, the process may end. If so, the process may return to step 505 to analyze the additional stopping point.

If, in step 506, the distance is not within the threshold, the method may proceed to step 509 in which the first stopping point may be further analyzed and a determination may be made as to whether the first stopping point is within a threshold distance to a road stopping object.

Similarly, if, in step 507, the distance is not within the threshold, the method may proceed to step 509 in which the first stopping point may be analyzed as indicated above.

With further reference to step 509 a road stopping object may include one or more of: street lights, street signs, traffic data, parking lots, and any other object that would indicate the stopping of a vehicle on a roadway. The threshold distance to a road stopping object may be between 0 m and 100 m, between 10 m and 90 m, between 15 m and 20 m, greater than 5 m, less than 50 m, greater than 12 m, less than 30 m, or any other value. In some examples the threshold distance may also depend on a variety of factors, such as map data, including train track file source, type of mobile device 220, geographic data, weather data, or any other factor potentially affecting the accuracy of location data, including combinations therein.

If, in step 509, the distance (e.g., for the first stopping point) is within the threshold distance, i.e., lower than the threshold, the method proceeds to step 510. At step 510, the server analyzes the second consecutive stopping point in the data to determine whether the second consecutive stopping point is within a threshold distance to a road stopping object. The same or similar analysis may be performed to determine if the second consecutive stopping point is within a threshold distance to a road stopping object. In some aspects the threshold distance may be different for the first stopping point and the second consecutive stopping point. In other examples, the threshold may be the same.

If, in step 510, the distance is within the threshold, the method may proceed to step 511 and assigns the travel segment between the stopping points as a road travel segment.

If, in step 510, the distance is not within the threshold distance, the method may leave the travel segment unassigned and proceed to step 512. At step 512 a determination may be made as to whether there is a next stopping point in the data from the second consecutive stopping point. If there is a next consecutive stopping point, the method will proceed back step 505, and begin by reassigning what was previously the second consecutive stopping as a first stopping point, and reiterating the process. If at step 512 there is no consecutive stopping point, the method proceeds to step 513 and ends.

Figure 6:
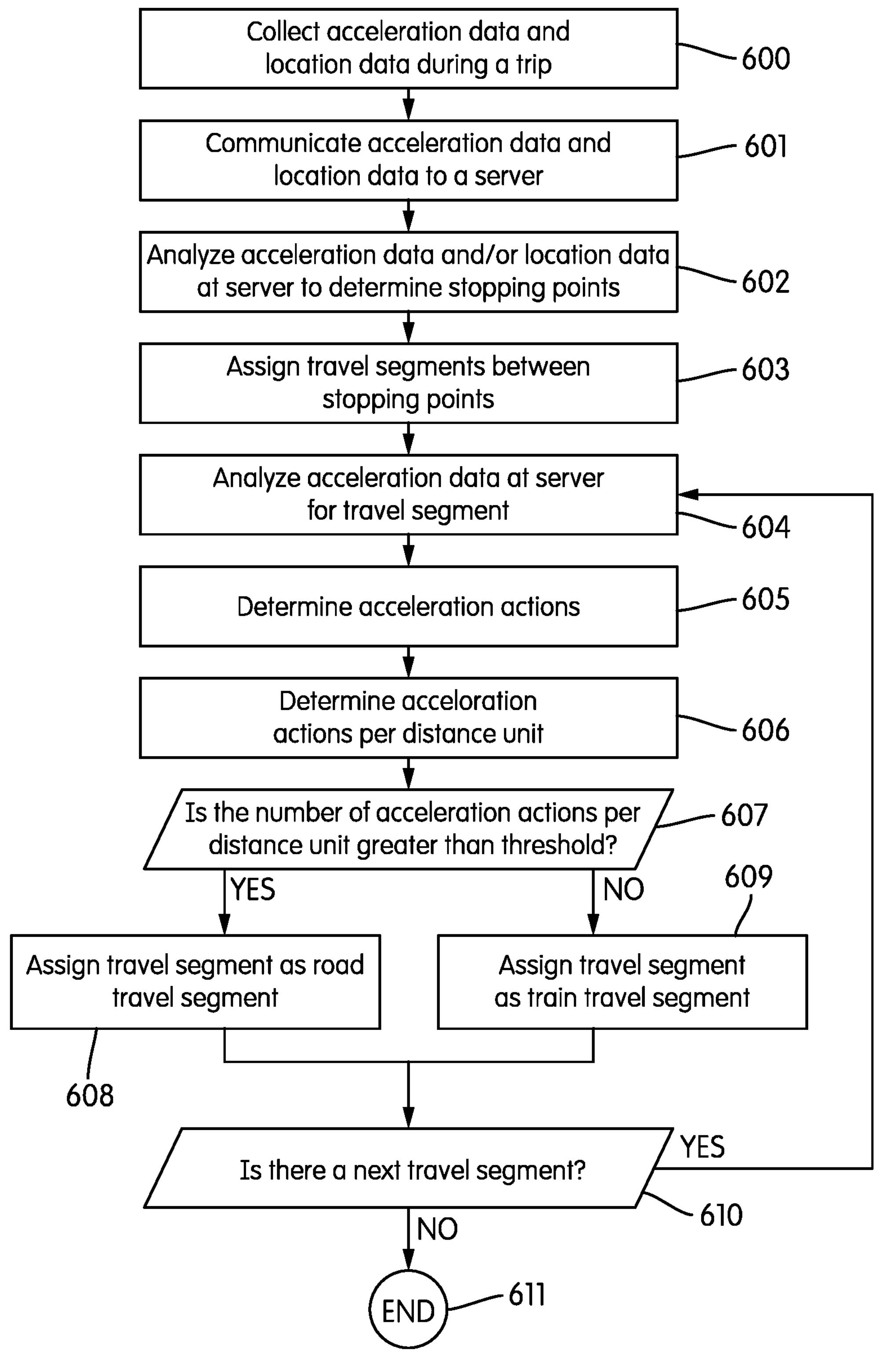
FIG. 6 is a flow diagram illustrating an example method of collecting acceleration data and location data and analyzing it to determine vehicle mode based on a number of acceleration points during the travel segment according to one or more aspects of the disclosure.

FIG. 6 is an example flowchart illustrating a method of using acceleration data and location data to determine a vehicle mode for travel segments by calculating an average number of acceleration actions over a threshold per a distance unit. In step 600, acceleration data and location data may be collected throughout the trip. Aspects of this step may be similar to those described above with respect to step 300 in FIG. 3. In step 601, the acceleration data and location data collected at step 600 may be communicated to a server. Aspects of this step may be similar to those described above with respect to step 301 in FIG. 3. In step 602, the server may analyze the acceleration data to determine stopping points during the trip. A stopping point may be defined as a period during the trip where the vehicle in which the user is traveling has a velocity of zero or is below a threshold and is therefore not moving. A stopping point may also include one or more periods during a trip in which the vehicle has a velocity below a predetermined threshold. For instance, if the velocity is below a predetermined threshold (e.g., 5 mph, 3 mph, etc.) the system may identify that period as a stopping point, even though the vehicle has not made a complete stop. This may aid in accounting for periods in which a driver may not come to a complete stop, for instance, at a stop sign.

In some aspects the acceleration data may be analyzed to calculate when the vehicle's velocity is zero or near zero (e.g., below a predetermined threshold) to determine stopping points. In some aspects the location data may be analyzed to determine stopping points. As one example, if consecutive location data points are the same (e.g., indicate a same location via GPS or other data), the system may determine the vehicle is at a stopping point. In further aspects, the accelerometer 223 may record velocity data during a trip. In these aspects the velocity data may be communicated to a server, which may be processor 224 or vehicle mode detection server 250. In these aspects the velocity data may be analyzed to determine stopping points during the trip. In different aspects the server may receive and analyze any combination of acceleration data, location data, and velocity data to determine stopping points.

After determining stopping points during the trip, the server may assign data points between consecutive stopping points as a travel segment as shown in step 603. A travel segment may define any portion of a trip in which a vehicle is moving. In other aspects a travel segment may refer to any portion of a trip. In different aspects the travel segment may include periods of acceleration, deceleration, braking, turning, stopping, or consistent velocity. It should be noted that any trip taken by a user may comprise a single travel segment or any number of travel segments. The vehicle mode detection server 250 may then analyze acceleration data at step 604. The server may determine the number of acceleration actions for a travel segment in step 605. An acceleration action may be or include a recorded data point where the acceleration value is greater than a predetermined acceleration threshold. In some aspects, the acceleration threshold may be between 0.5 $m/s^2$ and 5 $m/s^2$, between 1 $m/s^2$ and 8 $m/s^2$, greater than 0.2 $m/s^2$, less than 8 $m/s^2$, greater than 0.7 $m/s^2$, less than 5 $m/s^2$, or any other value. In some aspects the acceleration threshold may be 1 $m/s^2$. The server 250 may normalize the acceleration actions per a unit distance at step 606. In some aspects the unit distance may be in miles, such that the server determines acceleration actions per miles. In other aspects distance units may be any measurement, including m, km, ft, etc. In some aspects the acceleration actions may be normalized by a different parameter, such as time.

After determining acceleration actions per distance unit (e.g., a number of acceleration actions) for a travel segment, the server 250 may compare this to a predetermined threshold and a determination may be made as to whether the number of acceleration actions per distance unit is greater than a predetermined threshold in step 607. In some examples the acceleration action threshold may be between 5 and 100, between 20 and 75, greater than 15, less than 90, greater than 40, or less than 65, or any other value. In some aspects the action threshold may be 60. In some examples, the acceleration action threshold may depend on additional factors, such as location, geography, traffic, etc. In further aspects the acceleration action threshold may be changed or updated based on the collection of additional data.

If, at step 607, the number of acceleration actions per distance unit is greater than the threshold, the method may proceed to step 608 and assign the travel segment as a road travel segment. In step 610, a determination may be made as to whether there are additional travel segments for analysis. If not, the process may end. If so, the process may return to step 604 to evaluate additional travel segments.

If at step 607, the number of acceleration actions per distance unit is not greater than the threshold, i.e., less than or equal to, the method may proceed to step 609 and assigns the travel segment as a train travel segment. Although the arrangements described with respect to FIG. 6 are directed to assigning a travel segment as a road segment or a train segment, various other vehicle modes may also be assigned without departing from the invention. For instance, the system may assign the travel segment as any other predetermined vehicle mode, such as boat, plane, Segway, hoverboard, etc. At step 610 a determination is made as to whether there is another travel segment associated with the trip. If yes, the method proceeds back to step 604, and analyzes acceleration data for a next travel segment. If not, the process may end.

Figure 7:
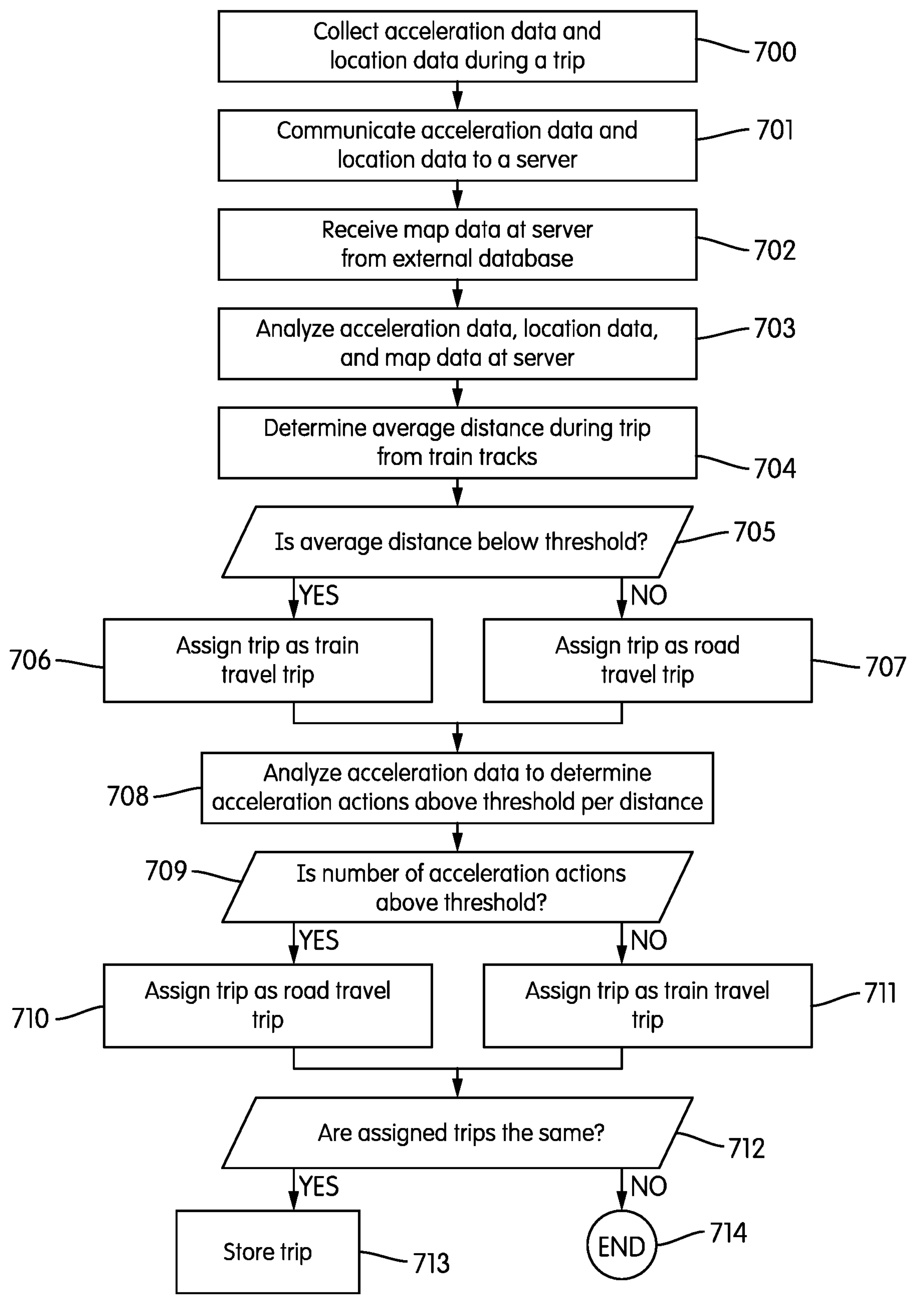
FIG. 7 is a flow diagram illustrating an example method of collecting acceleration data and location data and analyzing it to determine vehicle mode based on average snapping distance and acceleration actions during a travel segment according to one or more aspects of the disclosure.

FIG. 7 shows an illustrative method of using acceleration data and location data to determine vehicle mode for a trip based on performing multiple analyses on the data to detect false positives. In step 700, acceleration data and location data may be collected throughout the trip. Aspects of this step may be similar to those described above with respect to step 300 in FIG. 3. In step 701, the acceleration data and location data collected at step 700 may be communicated to a server. Aspects of this step may be similar to those described above with respect to step 301 in FIG. 3.

In step 702, the vehicle mode detection server 250 may receive map data from an external database, such as the external database 260 shown in FIG. 2. In some aspects the map data may include roadway data, street light data, stop sign data, train track data, train station data, waterway data, port data, traffic data, weather data, geography data, and any other data that may affect a vehicle while traversing a route. In some aspects the map data may be received from one external database, two external databases, or any number of external databases. The vehicle mode detection server 250 may receive any combination of one or more data sets from one or more external databases. In some aspects the vehicle mode detection server 250 may receive map data, such roadway files and/or train track files from an external database 260 such as the Department of Transportation, public open sources, academic institutions, open data portals, public research groups, or combinations therein. In some aspects the routeway data may comprise data for a routeway type. In certain aspects the routeway type may be train tracks, roadways, waterways, etc. In one example the routeway type may be train tracks, and the routeway data may comprise train track data and train station data. In other aspects, the routeway type may be roadways, and the routeway data may include roadways, streets lights, stop signs, etc.

After the vehicle mode detection server 250 receives the map data, it may analyze the acceleration data, location data and map data at the vehicle mode detection server 250 in step 703. In some aspects, the server 250 may analyze the location data collected during a trip and data received from an external database 260, such as train track data. The server 250 may analyze these data sets to determine a snapping distance to a train track for each location data point collected during the trip. In further aspects, the server 250 may analyze the location data collected throughout a trip and determine the average snapping distance to a train track throughout the trip in step 704.

In step 705 the average snapping distance to a train track may be compared to a threshold value and a determination may be made as to whether the average snapping distance is below the threshold value. If the average snapping distance is below the threshold, the method may proceed to step 706 and assign the trip as a train trip. In some arrangements, the average snapping distance to a train track threshold value may be between 0 m and 100 m, between 10 m and 90 m, between 15 m and 20 m, greater than 5 m, less than 50 m, greater than 12 m, less than 30 m, or any value. In some examples the threshold value may be 17.8 m. The threshold value may be changed based on additional data and model analysis. The threshold value may also depend on a variety of factors, such as map data, including train track file source, type of mobile device 220, geographic data, weather data, or any other factor potentially affecting the accuracy of location data, including combinations therein.

If, at step 705, however, the average snapping distance is not below the threshold, such that it may be equal to or greater than the threshold, the method may proceed to step 707, and assigns the trip as a road travel trip. As discussed above, various other vehicle mode trips may also be assigned without departing from the invention. For instance, the system may assign the trip as a different vehicle mode trip (e.g., boat, airplane, bicycle, etc.), or may not assign the trip at all. In some aspects, additional analysis may be performed on the data to determine a vehicle mode associated with the trip.

At step 708, the acceleration data may be analyzed to determine the number of acceleration actions for the trip. An acceleration action may include a recorded data point where the acceleration value is greater than a predetermined acceleration threshold. In some aspects, the acceleration threshold may be between 0.5 $m/s^2$ and 5 $m/s^2$, between 1 $m/s^2$ and 8 $m/s^2$, greater than 0.2 $m/s^2$, less than 8 $m/s^2$, greater than 0.7 $m/s^2$, less than 5 $m/s^2$, or any other value. In some aspects the acceleration threshold may be 1 $m/s^2$. Analyzing the acceleration data to determine the number of acceleration actions may further include normalizing the acceleration actions per a unit distance. In some aspects the unit distance may be in miles, such that the server determines acceleration actions per miles. In other aspects distance units may be any measurement, including m, km, ft, etc. In some aspects the acceleration actions may be normalized by a different parameter, such as time.

After determining the number of acceleration actions per distance unit for the trip, the server 250 may compare this to a predetermined threshold and a determination may be made as to whether the number of acceleration actions is above a threshold in step 709. In some examples the acceleration action threshold may be between 5 and 100, between 20 and 75, greater than 15, less than 90, greater than 40, or less than 65, or any other value. In at least some examples the acceleration action threshold may be 60. The acceleration action threshold may be based on additional factors, such as location, geography, traffic, etc. In further aspects the acceleration action threshold may be changed or updated based on the collection of additional data. If, at step 709, the number of acceleration actions per distance unit is greater than the threshold, the method proceeds to step 710 and assigns the trip as a road travel trip. If at step 709, the number of acceleration actions per distance unit is not greater than the threshold, i.e., less than or equal to the threshold, the method proceeds to step 711 and may assign the trip as a train travel trip. At step 712 the server 250 determines whether the trip assignments from steps 706/707 and 710/711 are the same. If the trip assignments are the same, the method proceeds to step 713, and stores the trip assignment at a server or memory. If the trip assignments are not the same, the method proceeds to step 714 and ends without storing the trip assignments.

Figure 8:
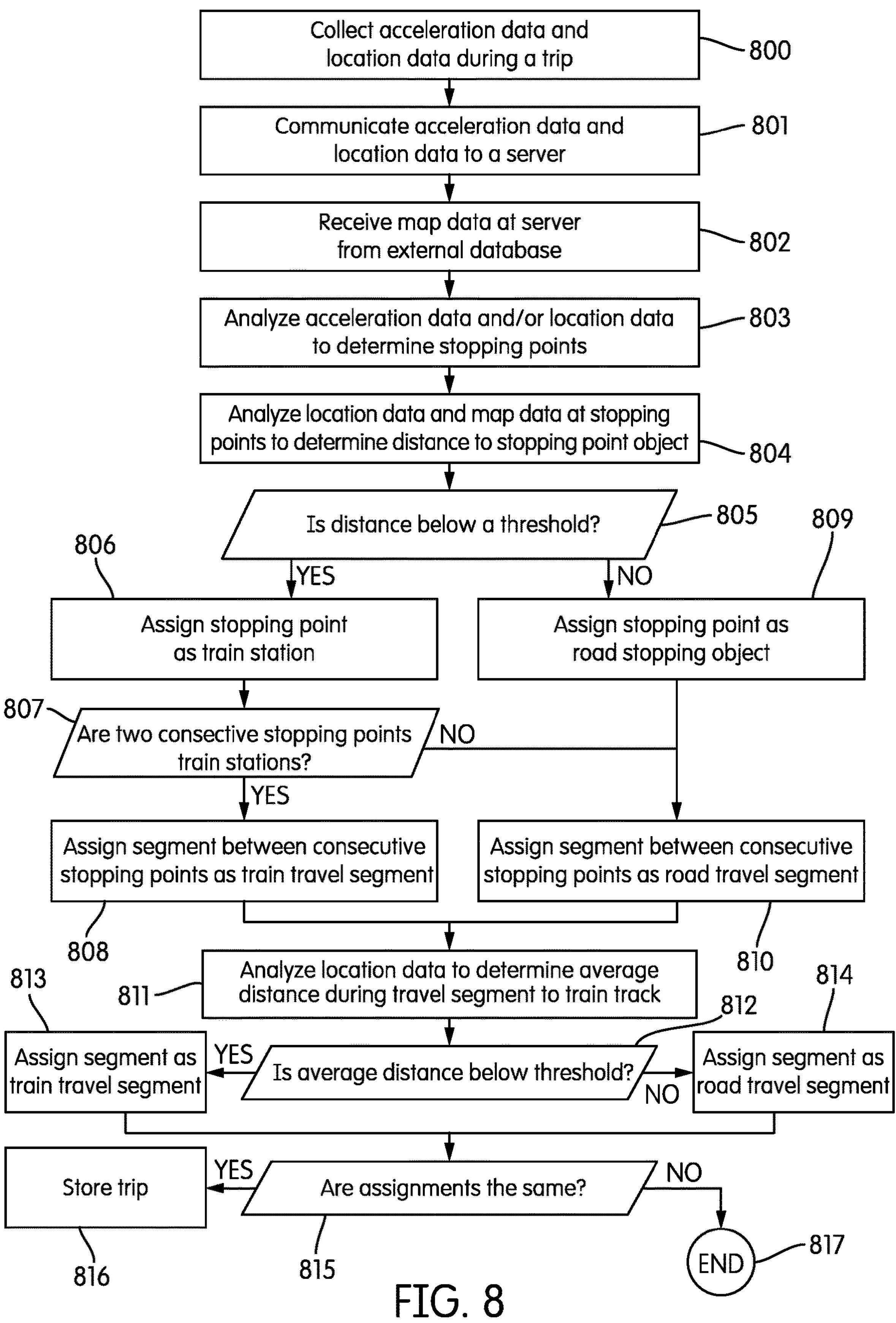
FIG. 8 is a flow diagram illustrating an example method of collecting acceleration data and location data and analyzing it to determine vehicle mode based on stopping points at the beginning and end of a travel segment and average snapping distance during a travel segment according to one or more aspects of the disclosure.

FIG. 8 illustrates another example method of using acceleration data and location data to determine vehicle mode for a trip based on performing multiple analyses on the data to detect false positives. In step 800, acceleration data and location data may be collected throughout the trip. Aspects of this step may be similar to those described above with respect to step 300 in FIG. 3. In step 801, the acceleration data and location data collected at step 800 may be communicated to a server. Aspects of this step may be similar to those described above with respect to step 301 in FIG. 3.

In step 802, the vehicle mode detection server 250 may receive map data from an external database, such as the external database 260 shown in FIG. 2. In some aspects the map data may include roadway data, street light data, stop sign data, train track data, train station data, waterway data, port data, traffic data, weather data, geography data, and any other data that may affect a vehicle while traversing a route. In some aspects the map data may be received from one external database, two external databases, or any number of external databases. The vehicle mode detection server 250 may receive any combination of one or more data sets from one or more external databases. In some aspects the vehicle mode detection server 250 may receive map data, such roadway files and/or train track files from an external database 260 such as the Department of Transportation, public open sources, academic institutions, open data portals, public research groups, or combinations therein. In some aspects the routeway data may comprise data for a routeway type. In certain aspects the routeway type may be train tracks, roadways, waterways, etc. In one example the routeway type may be train tracks, and the routeway data may comprise train track data and train station data. In other aspects, the routeway type may be roadways, and the routeway data may include roadways, streets lights, stop signs, etc.

After receiving the map data, the vehicle mode detection server 250 may analyze the location data associated with stopping points and map data shown as step 803. In some aspects, the server 250 may analyze the location of stopping points and map data relating to routeway stopping objects. In some aspects routeway stopping objects may be objects that may cause vehicle traveling along the routeway to stop. In different aspects routeway stopping objects may comprise permanent stopping objects (i.e., train stations, street lights, stop signs, parking lots, dock, ports, and anything else designed to stop a vehicle traveling along a routeway) In other aspects, the map data may include current dynamic stopping objects. Current dynamic stopping objects may be determined from map data relating to traffic, congestion, train delays, weather, hazards, etc. For example, the map data may include current data indicating that traffic on a roadway is congested to the point where vehicles are stopped. In this example, location where traffic is stopped may be labeled a dynamic stopping object until the congestion clears. In other examples map data may include train delay data indicating that a train is stopped at a location between stations, indicating a dynamic stopping object.

The server 250 may analyze location data at stopping points and stopping object data to determine a distance to a stopping point object for each stopping point location in step 804. In some examples the stopping point object may be a single object, such as a street light, or may be a combination of objects. In some aspects the stopping point object may be all objects relating to the stopping of a particular vehicle mode. As such, a road stopping object may include street lights, street signs, traffic data, parking lots, and any other object that would indicating the stopping of an automobile on a roadway. In one example, the stopping point object may be a train station, such that the system may determine the distance from the stopping point to a train station.

In step 804, the server may determine the distance between a first stopping point and a train station. At step 805 the system may determine if that distance is within a predetermined threshold. The threshold distance for distance to a train station may be between 0 m and 100 m, between 10 m and 90 m, between 15 m and 20 m, greater than 5 m, less than 50 m, greater than 12 m, less than 30 m, or any other value. In some aspects the threshold distance may be changed based on additional data and model analysis. The threshold distance may also be based on a variety of factors, such as map data, including train track file source, type of mobile device 220, geographic data, weather data, or any other factor potentially affecting the accuracy of location data, including combinations therein. If, in step 805, the distance is below the threshold distance, the method proceeds to step 806 and assigns the stopping point as a train station. At step 807, the server analyzes a second consecutive stopping point in the data to determine if the second consecutive stopping point is within a threshold distance to a train station. The second consecutive stopping point may be the next stopping point after the first stopping point and after uninterrupted travel. In some aspects the threshold distance may be different for the first stopping point and the second consecutive stopping point. If, in step 807, the distance is within the threshold distance, the method proceeds to step 808 and assigns the travel segment between the stopping points as a train travel segment. If, in step 807, the distance is not within the threshold distance, the method proceeds to step 810 and may assign the segment as a road travel segment.

If, at step 805, the distance is not below the threshold, i.e., equal or greater than, the server may assign the stopping point as a road stopping object in step 809. As discussed above, the method may proceed to step 810 and the server 250 may assign the segment between the first stopping point and the second consecutive stopping point as a road travel segment. It should be noted that in some aspects only the first stopping point will have been analyzed. However, in some aspects the system may recognize that if the first stopping point is not within the threshold distance to a train stopping object, it may assign the segment between the first stopping point and the second consecutive stopping point as a road travel segment without having analyzed the second consecutive stopping point. The method then proceeds to step 811.

At step 811, the vehicle mode detection server 250 may analyze location data during the travel segment to determine a snapping distance from each location data point to a routeway, such as a train track. In further aspects, as shown in step 811, the server 250 may analyze the location data collected throughout a travel segment and determine the average snapping distance to a train track throughout the travel segment. The average snapping distance to a train track may be compared to a threshold value and a determination may be made as to whether the average snapping distance is below the threshold at step 812. If the average snapping distance is below the threshold, the method proceeds to step 813, and assigns the travel segment as a train travel segment. In some arrangements the average snapping distance to a train track threshold value may be between 0 m and 100 m, between 10 m and 90 m, between 15 m and 20 m, greater than 5 m, less than 50 m, greater than 12 m, less than 30 m, or any value. In at least some examples the threshold value may be 17.8 m. In certain aspects the threshold value may be changed based on additional data and model analysis. The threshold value may also be based on a variety of factors, such as map data, including train track file source, type of mobile device 220, geographic data, weather data, or any other factor potentially affecting the accuracy of location data, including combinations therein.

If, at step 812, however, the average snapping distance is not below the threshold, such that it may be equal to or greater than the threshold, the method may proceed to step 814, and assigns the travel segment as a road travel segment. At step 815, the server 250 may determine whether the trip assignments from steps 808/810 and 813/814 are the same. If the trip assignments are the same, the method proceeds to step 816, and stores the trip assignment at a server or memory. If the trip assignments are not the same, the method proceeds to step 817 and ends without storing the trip assignments.

Figure 9:
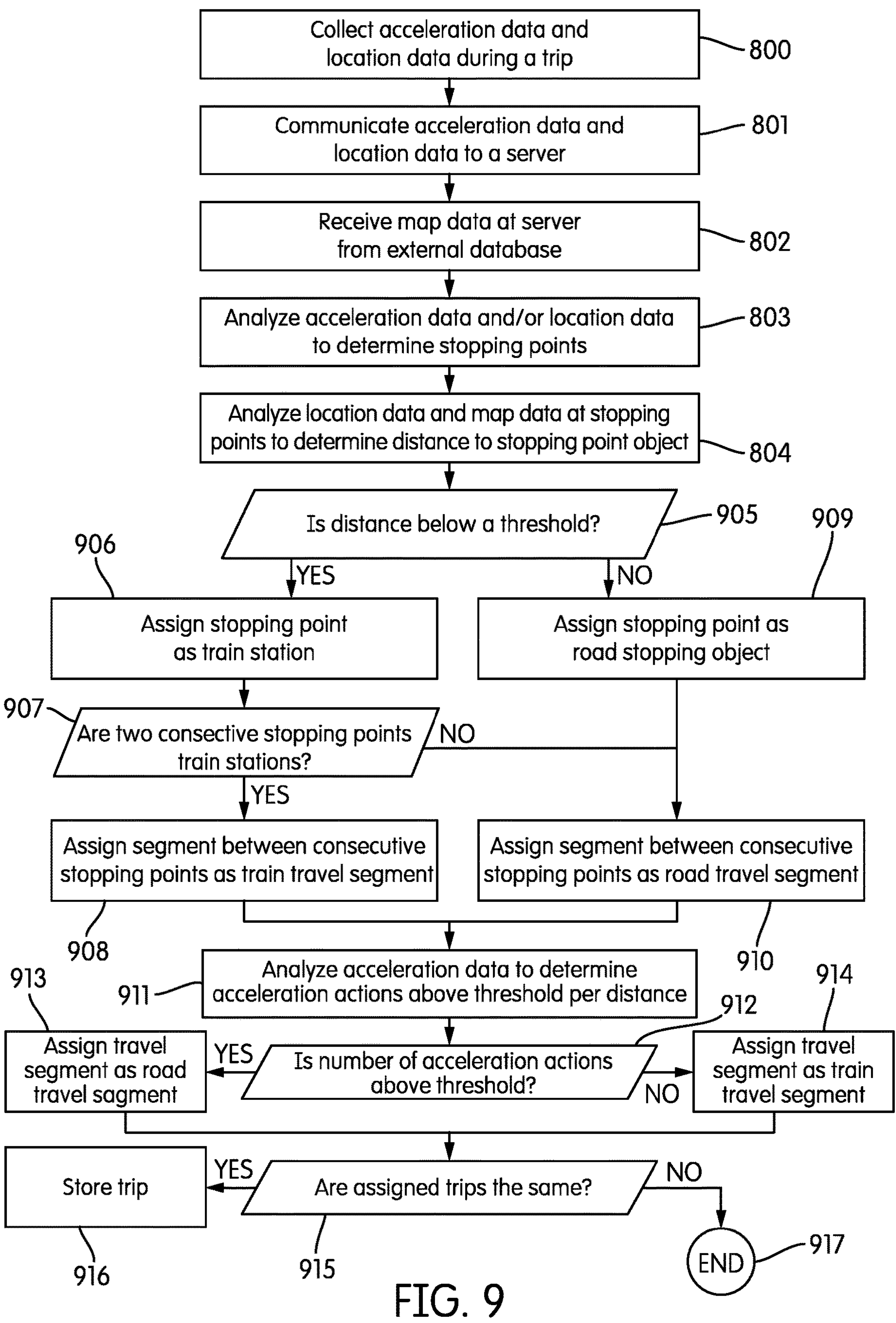
FIG. 9 is a flow diagram illustrating an example method of collecting acceleration data and location data and analyzing it to determine vehicle mode based on stopping points at the beginning and end of a travel segment and acceleration actions during the travel segment according to one or more aspects of the disclosure.

FIG. 9 illustrates another example method of using acceleration data and location data to determine vehicle mode for a trip based on performing multiple analyses on the data to detect false positives. In step 900, acceleration data and location data may be collected throughout the trip. Aspects of this step may be similar to those described above with respect to step 300 in FIG. 3. In step 901, the acceleration data and location data collected at step 900 may be communicated to a server. Aspects of this step may be similar to those described above with respect to step 301 in FIG. 3.

In step 902, the vehicle mode detection server 250 may receive map data from an external database, such as the external database 260 shown in FIG. 2. In some aspects the map data may include roadway data, street light data, stop sign data, train track data, train station data, waterway data, port data, traffic data, weather data, geography data, and any other data that may affect a vehicle while traversing a route. In some aspects the map data may be received from one external database, two external databases, or any number of external databases. The vehicle mode detection server 250 may receive any combination of one or more data sets from one or more external databases. In some aspects the vehicle mode detection server 250 may receive map data, such roadway files and/or train track files from an external database 260 such as the Department of Transportation, public open sources, academic institutions, open data portals, public research groups, or combinations therein. In some aspects the routeway data may comprise data for a routeway type. In certain aspects the routeway type may be train tracks, roadways, waterways, etc. In one example the routeway type may be train tracks, and the routeway data may comprise train track data and train station data. In other aspects, the routeway type may be roadways, and the routeway data may include roadways, streets lights, stop signs, etc.

After the receiving the map data, the vehicle mode detection server 250 may analyze the location data associated with stopping points and map data shown as step 903. In some aspects, the server 250 may analyze the location of stopping points and map data relating to routeway stopping objects. In some aspects routeway stopping objects may be objects that may cause a vehicle traveling along the routeway to stop. In some examples routeway stopping objects may comprise permanent stopping objects (i.e., train stations, street lights, stop signs, parking lots, dock, ports, and anything else designed to stop a vehicle traveling along a routeway) In other aspects, the map data may include current dynamic stopping objects. Current dynamic stopping objects may be determined from map data relating to traffic, congestion, train delays, weather, hazards, etc. For example, the map data may include current data indicating that traffic on a roadway is congested to the point where vehicles are stopped. In this example, location where traffic is stopped may be labeled a dynamic stopping object until the congestion clears. In other examples map data may include train delay data indicating that a train is stopped at a location between stations, indicating a dynamic stopping object. The server 250 may analyze location data at stopping points and stopping object data to determine a distance to a stopping point object for each stopping point location in step 904. In different aspects the stopping point object may be a single object, such as a street light, or may be a combination of objects. In some aspects the stopping point object may be objects relating to the stopping of a particular vehicle mode. As such, a road stopping object may include street lights, street signs, traffic data, parking lots, and any other object that would indicating the stopping of an automobile on a roadway. In one example, the stopping point object may be a train station, such that the system may determine the distance from the stopping point to a train station.

In step 904, for example, the server 250 may determine the distance between a first stopping point and a train station. At step 905 the system may determine if that distance is below a predetermined threshold. The threshold distance for distance to a train station may be between 0 m and 100 m, between 10 m and 90 m, between 15 m and 20 m, greater than 5 m, less than 50 m, greater than 12 m, less than 30 m, or any other value. In certain aspects the threshold value may be changed based on additional data and model analysis. The threshold distance may also be based on a variety of factors, such as map data, including train track file source, type of mobile device 220, geographic data, weather data, or any other factor potentially affecting the accuracy of location data, including combinations therein.

If the distance is below the threshold distance, the method proceeds to step 906 and assigns the stopping point as a train station. At step 907, the server analyzes a second consecutive stopping point in the data to determine if the second consecutive stopping point is within a threshold distance to a train station. In different aspects the train station evaluated at step 907 may be different from the stopping object evaluated in step 904. In some aspects the system may analyze map data to determine the nearest train station to the second consecutive stopping point, and determine if the distance between the second consecutive stopping point and the nearest train station is within the threshold. The second consecutive stopping point may be the next stopping point after the first stopping point and after uninterrupted travel. In some aspects the threshold distance may be different for the first stopping point analysis and the second stopping point analysis. In other examples, the thresholds may be the same. If the second consecutive stopping point is within the threshold distance to a train station, the system assigns the second consecutive stopping point as a train station.

If in step 907, the first stopping point and the second consecutive stopping point are both assigned as train stations, the method proceeds to step 908, assigns the travel segment between the stopping points as a train travel segment, and proceeds to step 911. If the distance at step 907 is not within the threshold distance, the method proceeds to step 910. If, at step 905, the distance is not below the threshold, i.e., equal or greater than, the method proceeds to step 909. At step 909 the server assigns the stopping point as a road stopping object, and proceeds to step 910. At step 910 the may assign the segments between consecutive stopping points as a road travel segment. The method proceeds from step 909 to 910, only a single stopping point will have been analyzed. However, because that stopping point has been assigned as a road stopping point, it will be proper to assign the travel segment to and from that stopping point as a road travel segment. Therefore, at step 910 the server may assign the travel segment between the first stopping point assigned as a road stopping object and the second consecutive stopping point as a road travel segment. The method then proceeds to step 911.

At step 911, the acceleration data may be analyzed. In some aspects the server will determine the number of acceleration actions for the trip. An acceleration action may include a recorded data point where the acceleration value is greater than a predetermined acceleration threshold. In some aspects, the acceleration threshold may be between 0.5 $m/s^2$ and 5 $m/s^2$, between 1 $m/s^2$ and 8 $m/s^2$, greater than 0.2 $m/s^2$, less than 8 $m/s^2$, greater than 0.7 $m/s^2$, less than 5 $m/s^2$, or any other value. In some aspects the acceleration threshold may be 1 $m/s^2$. In analyzing the acceleration data, the server 250 may also normalize the acceleration actions per a unit distance at step 911. In some aspects the unit distance may be in miles, such that the server determines acceleration actions per miles. In other aspects distance units may be any measurement, including m, km, ft, etc. In some aspects the acceleration actions may be normalized by a different parameter, such as time.

After determining acceleration actions per distance unit for the trip, the server 250 may compare this to a predetermined threshold, shown as step 912. In some examples the acceleration action threshold may be between 5 and 100, between 20 and 75, greater than 15, less than 90, greater than 40, or less than 65, or any other value. In some aspects the action threshold may be 60. In different aspects the acceleration action threshold may depend on additional factors, such as location, geography, traffic, etc. In further aspects the acceleration action threshold may be changed or updated based on the collection of additional data. If, at step 912, the number of acceleration actions per distance unit is greater than the threshold, the method proceeds to step 913 and assigns the travel segment as a road travel segment. The method then proceeds to step 915. If at step 912, the number of acceleration actions per distance unit is not greater than the threshold, i.e., less than or equal to, the method proceeds to step 914 and may assign the travel segment as a train travel segment. The method then proceeds to step 915. At step 915 the server 250 determines whether the trip assignments from steps 908/910 and 913/914 are the same. If the trip assignments are the same, the method proceeds to step 916, and stores the trip assignment at a server or memory. If the trip assignments are not the same, the method proceeds to step 917 and ends without storing the trip assignments.

In some aspects data collected by the vehicle mode detection system may be used by external networks, systems, processes, and/or devices. In one example, networks and systems utilized by insurance companies may use vehicle mode detection data in risk level analysis. Insurance providers may currently use data recorded by a customer's mobile device (e.g., with customer permission) while performing risk analysis associated with that customer. In doing so, an insurance provider may desire to assess customer data when the customer is travelling in a particular mode of vehicle. In some aspects, an insurance provider may wish to analyze data in which the customer is traveling in an automobile, such as a car, truck, or van. In some aspects, it would be beneficial to distinguish between travel data when the customer is operating a vehicle and when the customer is a passenger. In some examples, insurance systems may determine whether the customer is the operator of the vehicle for a travel segment based on the vehicle mode associated with that travel segment. For example, insurance systems may remove travel segment data associated with a customer if that travel segment is determined to be a train travel segment. In other aspects, an insurance system may analyze travel data relating to travel segments assigned as roadway travel segments. In further aspects, an insurance system may assign a customer a usage-based insurance where insurance rates are based upon vehicle operation by a customer. In these aspects it may be beneficial to differentiate customer vehicle data based on vehicle mode. In other aspects an insurance system may collect and analyze data associated with a particular customer or area. The insurance system may use this analyzed data in other models or predictive analysis. In some examples insurance systems may analyze a customer's travel data and recognize particular trips or routes, such as a commute, shopping, travel, etc. Vehicle mode analysis may be used to assign vehicle modes to particular travel segments along recognized trips or routes, such to ensure consistent data.

In further aspects the vehicle mode analysis may be used as an input for other systems. In some aspects others systems may analyze information based upon a detection of a certain vehicle mode associated with a travel segment. In some embodiments a mobile phone may collect and/or store certain types of data based upon a detected vehicle mode. In some aspect the mobile phone may record certain data during travel based on received or stored vehicle mode data. In certain aspects, a mobile phone may transmit data to a server based upon detection of a certain vehicle mode associated with a travel segment. In other embodiments the mobile phone may transmit all collected data, a portion of the data, or transmit a portion of the data and store a portion of the data based upon detection of a particular vehicle mode. In some aspects, other systems may analyze data sets based upon the associated vehicle mode. Insurance companies may sort and classify consumer data based upon the vehicle mode associated with a consumer's travel data. In different aspects, the insurance systems may recommend suitable products and/or services based upon this classification.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention. Any discussion of an element, step process, or example in relation to a described examples may in different applications apply to all other embodiments or aspects mentioned throughout this disclosure.

What is claimed is:

1. A system for detecting a vehicle mode associated with a travel segment, comprising:

at least one processor; and at least one memory storing computer-executable instructions that, when executed by the at least one processor, cause the at least one processor to:

associate a user of a mobile device with an insurance policy, the insurance policy indicating a registered vehicle mode assigned to one or more previous travel segments;

receive mobile device sensor data collected by one or more sensors of the mobile device during a trip, the one or more sensors including at least one of a location sensor or an accelerometer, the mobile device sensor data including acceleration data and location data;

determine, based on the acceleration data and the location data, a first stopping point and a second stopping point encountered during the trip;

assign the mobile device sensor data collected between the first stopping point and the second stopping point as the travel segment;

calculate a number of acceleration actions per distance unit for the travel segment;

determine, based on the number of acceleration actions per distance unit and a predefined acceleration action threshold value, the vehicle mode associated with the travel segment;

validate the vehicle mode by comparing the vehicle mode to the registered vehicle mode, wherein the validating includes determining whether the vehicle mode corresponds to the registered vehicle mode of at least one previous travel segment of the one or more previous travel segments;

assign, based on the validation of the vehicle mode, the vehicle mode to the travel segment; and control, via the processor, a wireless transmission of information of the travel segment to an external system, wherein the control of the wireless transmission comprises:

transmit the travel segment and the associated mobile device sensor data to the external system when the vehicle mode corresponds to the registered vehicle mode; and refrain from transmitting the travel segment and the associated mobile device sensor data to the external system when the vehicle mode does not correspond to the registered vehicle mode.

2. The system of claim 1, wherein the one or more sensors further include at least one of a gyroscope or a speedometer.

3. The system of claim 1, wherein the first and second stopping points include a period during the travel segment in which a vehicle has a velocity below a predetermined threshold.

4. The system of claim 1, wherein the first and second stopping points are determined based on consecutive location data points being the same.

5. The system of claim 1, wherein the computer-executable instructions when executed by the at least one processor, further cause the at least one processor to:

receive, from an external database, map data including data comprising information about one or more routeways.

6. A method comprising:

associating a user of a mobile device with an insurance policy, the insurance policy indicating a registered vehicle mode assigned to one or more previous travel segments;

receiving mobile device sensor data obtained by one or more sensors of the mobile device during a trip, the one or more sensors including at least one of a location sensor or an accelerometer, the mobile device sensor data including acceleration data and location data;

determining, based on the acceleration data and the location data, a first stopping point and a second stopping point encountered during the trip;

assigning the mobile device sensor data collected between the first stopping point and the second stopping point as a travel segment;

calculate a number of acceleration actions per distance unit for the travel segment;

determining, based on the number of acceleration actions per distance unit and a predefined acceleration action threshold value, a vehicle mode associated with the travel segment;

validating the vehicle mode by comparing the vehicle mode to the registered vehicle mode, wherein the validating includes determining whether the vehicle mode corresponds to the registered vehicle mode of at least one previous travel segment of the one or more previous travel segments;

assigning, based on the validation of the vehicle mode, the vehicle mode to the travel segment; and controlling a wireless transmission of information of the travel segment to an external system, wherein the controlling of the wireless transmission comprises:

transmitting the travel segment and the associated mobile device sensor data to the external system when the vehicle mode corresponds to the registered vehicle mode; and refraining from transmitting the travel segment and the associated mobile device sensor data to the external system when the vehicle mode does not correspond to the registered vehicle mode.

7. The method of claim 6, wherein the one or more sensors further include at least one of a gyroscope or a speedometer.

8. The method of claim 6, wherein the first and second stopping points include a period during the travel segment in which a vehicle has a velocity below a predetermined threshold.

9. The method of claim 6, wherein the first and second stopping points are determined based on consecutive location data points not changing.

10. The method of claim 6, wherein the travel segment is a portion of the trip between the first and second stopping points.

11. The method of claim 6, further comprising:

receiving, from an external database, map data including data comprising information about one or more routeways.

12. A non-transitory computer readable medium storing computer-executable instructions that, when executed, cause a computing device to:

associate a user of a mobile device with an insurance policy, the insurance policy indicating a registered vehicle mode assigned to one or more previous travel segments;

receive mobile device sensor data collected by one or more sensors of the mobile device during a trip, the one or more sensors including at least one of a location sensor or an accelerometer, the mobile device sensor data including acceleration data and location data;

determine, based on the acceleration data and the location data, a first stopping point and a second stopping point encountered during the trip;

assign the mobile device sensor data collected between the first stopping point and the second stopping point as a travel segment;

calculate a number of acceleration actions per distance unit for the travel segment;

determine, based on the number of acceleration actions per distance unit and a predefined acceleration action threshold value, a vehicle mode associated with the travel segment;

validate the vehicle mode by comparing the vehicle mode to the registered vehicle mode, wherein the validating includes determining whether the vehicle mode corresponds to the registered vehicle mode of at least one previous travel segment of the one or more previous travel segments;

assign, based on the validation of the vehicle mode, the vehicle mode to the travel segment; and control a wireless transmission of information of the travel segment to an external system, wherein the control of the wireless transmission comprises:

transmit the travel segment and the associated mobile device sensor data to the external system when the vehicle mode corresponds to the registered vehicle mode; and refrain from transmitting the travel segment and the associated mobile device sensor data to the external system when the vehicle mode does not correspond to the registered vehicle mode.

13. The non-transitory computer readable medium of claim 12, wherein the one or more sensors include at least one of a gyroscope or a speedometer.

14. The non-transitory computer readable medium of claim 12, wherein the first and second stopping points include a period during the travel segment in which a vehicle has a velocity below a predetermined threshold.

15. The non-transitory computer readable medium of claim 12, wherein the first and second stopping points are determined based on consecutive location data points being the same.

16. The non-transitory computer readable medium of claim 12, wherein the computer-executable instructions when executed by the computing device, further cause the computer device to:

receive, from an external database, map data including data comprising information about one or more routeways.

* * * * *